(12) United States Patent
Varner et al.

(10) Patent No.: US 12,397,263 B2
(45) Date of Patent: Aug. 26, 2025

(54) SIMPLIFIED ARCHITECTURE FOR DESALINATION VIA ELECTRODIALYSIS

(71) Applicant: Massachusetts Institute of Technology, Cambridge, MA (US)

(72) Inventors: Hannah M. Varner, Cambridge, MA (US); Amos G. Winter, Somerville, MA (US); Sahil Rajesh Shah, Cambridge, MA (US); Soraya Honarparvar, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/021,000

(22) PCT Filed: Aug. 13, 2021

(86) PCT No.: PCT/US2021/045954
§ 371 (c)(1),
(2) Date: Feb. 13, 2023

(87) PCT Pub. No.: WO2022/036228
PCT Pub. Date: Feb. 17, 2022

(65) Prior Publication Data
US 2023/0241554 A1      Aug. 3, 2023

Related U.S. Application Data

(60) Provisional application No. 63/084,654, filed on Sep. 29, 2020, provisional application No. 63/065,574, filed on Aug. 14, 2020.

(51) Int. Cl.
*B01D 61/46*       (2006.01)
*B01D 61/42*       (2006.01)
(Continued)

(52) U.S. Cl.
CPC ......... *B01D 61/463* (2022.08); *B01D 61/423* (2022.08); *B01D 61/44* (2013.01);
(Continued)

(58) Field of Classification Search
CPC .... B01D 61/44; B01D 61/422; B01D 61/423; B01D 61/48; B01D 61/50; B01D 61/52; B01D 61/54; C02F 1/4693
See application file for complete search history.

(56) References Cited

U.S. PATENT DOCUMENTS

| 4,539,091 A | * | 9/1985 | Kaneda | ................. | B01D 61/44 |
| | | | | | 126/684 |
| 6,117,297 A | | 9/2000 | Goldstein | | |

(Continued)

OTHER PUBLICATIONS

K. Nayar, et al., Feasibility Study of an Electrodialysis System for In-Home Water Desalination and Purification in Urban India, Proceedings of the ASME 2015 International Design Engineering Technical Conferences & Computers and Information in Engineering Conference (IDETC/CIE) 2015, Boston, MA (Aug. 2015).

(Continued)

*Primary Examiner* — Luan V Van
(74) *Attorney, Agent, or Firm* — Modern Times Legal; Robert J. Saye

(57) ABSTRACT

An electrodialysis desalination device includes a first electrode including a first-stage side; a second electrode including a first-stage side; and a first stage between the first-stage side of the first electrode and the first-stage side of the second electrode. The first stage includes at least one first-stage cell pair positioned between the first-stage side of the first electrode and the first-stage side of the second electrode, and each cell pair includes a pair of first-stage selectively permeable ion-exchange membranes with alternating selectivity that define first-stage channels on opposite sides of each first-stage membrane for respective flows of a first- (Continued)

stage diluate stream and a first-stage concentrate stream. A single pump is configured to pump the diluate streams and the concentrate streams through the first stage.

30 Claims, 14 Drawing Sheets

(51) Int. Cl.
  *B01D 61/44* (2006.01)
  *B01D 61/54* (2006.01)
  *B01D 65/02* (2006.01)
  *C02F 1/469* (2023.01)

(52) U.S. Cl.
  CPC ........... *B01D 61/468* (2022.08); *B01D 61/54* (2013.01); *B01D 65/02* (2013.01); *C02F 1/4693* (2013.01); *B01D 2311/16* (2013.01); *B01D 2313/19* (2013.01); *B01D 2313/243* (2013.01); *B01D 2313/365* (2013.01); *B01D 2319/025* (2013.01); *B01D 2321/223* (2013.01); *C02F 2209/05* (2013.01); *C02F 2209/40* (2013.01); *C02F 2301/08* (2013.01)

(56) References Cited

U.S. PATENT DOCUMENTS

| | | | |
|---|---|---|---|
| 2007/0215474 A1* | 9/2007 | Batchelder | B01D 61/422 204/524 |
| 2011/0284376 A1 | 11/2011 | Ng et al. | |
| 2015/0027890 A1* | 1/2015 | Jha | B01D 61/445 204/632 |
| 2015/0299003 A1* | 10/2015 | Fu | C02F 1/4693 210/348 |
| 2018/0093030 A1* | 4/2018 | Hestekin | B01D 61/28 |
| 2018/0362370 A1* | 12/2018 | Shah | C02F 1/4693 |

OTHER PUBLICATIONS

S. Thampy, et al., "Development of Hybrid Electrodialysis-Reverse Osmosis Domestic Desalination Unit for High Recovery of Product Water," 282 Desalination 104-108 (2011).
N. Wright, et al., "A Robust Model of Brackish Water Electrodialysis Desalination with Experimental Comparison at Different Size Scales," 443 Desalination 27-43 (Apr. 2018).
S. Shah, et al., "Using Feed-Forward Voltage-Control to Increase the Ion Removal Rate during Batch Electrodialysis Desalination of Brackish Water," 457 Desalination 62-74 (2019).
United States Patent and Trademark Office, International Search Report and Written Opinion for PCT/US21/45954.
H. Varner, et al., "Conserving water in urban Indian homes: proposing a purifier design optimized for capital cost within the market constraints (slide presentation)" ASME 2020 International Design Engineering Technical Conferences & Computers and Information in Engineering Conference (IDETC-CIE) (Aug. 17, 2020).
H. Varner, "Architecture and unit design of a capital cost optimized, household electrodialysis desalination device with continuous flow", Thesis for Master of Science in Mechanical Engineering at the Massachusetts Institute of Technology (Sep. 2020).
H. Varner, et al., "The Determination of a Cost Optimal Design for a Multiple Stage Continuous Electrodialysis Desalination Device for Use in a Domestic Point of Use Water Purification," ASME 2020 International Design Engineering Technical Conferences & Computers and Information in Engineering Conference (IDETC-CIE) (Aug. 17, 2020 or thereafter).

* cited by examiner

SIMPLIFIED ARCHITECTURE FOR DESALINATION VIA ELECTRODIALYSIS

RELATED APPLICATIONS

This application is a National Phase entry of International Application No. PCT/US2021/045954, filed 13 Aug. 2021. This application also claims the benefit of U.S. Provisional Application Nos. 63/084,654, filed 29 Sep. 2020, and 63/065,574, filed 14 Aug. 2020. The entire contents of these applications are incorporated herein by reference.

BACKGROUND

The discussion of the background state of the art, below, may reflect hindsight gained from the disclosed invention(s); and these characterizations are not necessarily admitted to be prior art.

Throughout much of the developing world, access to safe, reliable drinking water remains a challenge, as it is often intermittently available, biologically contaminated, or too saline to drink. Brackish groundwater constitutes a majority of the accessible fresh water in the world and is an under-utilized resource that is becoming more important to meet growing water needs in water-scarce regions. An exemplary case study in this work is domestic water needs in urban India. Domestic point of use (POU) water purifiers are found in homes across India, and the market is predicted to grow by over 14% from 2018 to 2023. Over 35% of new POU purifiers sold in India rely on reverse osmosis (RO). However, current point-of-use (POU) reverse osmosis (RO) products operate at low energy efficiency and water recovery, retaining only ~30% of the incoming water as product and rejecting the rest as waste.

Electrodialysis (ED) offers comparable energy efficiency with the possibility of conserving up to 90% of the feed water and electrodialysis (ED) systems can be designed and optimized for point-of-use brackish water applications. Electrodialysis is an alternative method of desalination that can provide higher water recovery and energetic efficiency than RO for brackish water desalination at the POU scale. ED is an established technology in industrial-scale applications with flow rates exceeding 1,000 m$^3$ per day and in diverse applications from food and wastewater processing to manufacturing as well as in producing drinking water. However, ED has not been known to have been successfully deployed at domestic scales, where daily water requirements are under 0.1 m$^3$ per day. Previous research has attempted to scale ED systems to POU size by either using batch processing or by staging ED with RO, but neither architecture has been commercially adopted. Applying ED in a domestic setting is also challenging because capital cost becomes equally important to technical function. Domestic POU water purifiers are consumer items; therefore, the end user is highly sensitive to the purchase price.

Water scarcity is a global concern and is particularly relevant in India, where the government rates only 63% of their communities as having access to safe groundwater reserves. To meet water demand across the country, water sources of lower quality, including brackish groundwater [with >3,000 mg/L total dissolved salts (TDS)] or biologically contaminated surface waters, are frequently tapped to supplement or replace inconsistent municipal supplies. Desalination of brackish groundwater to a potable salinity (<500 mg/L TDS) is necessary to meet World Health Organization guidelines for safe drinking water.

In the Indian domestic context, water is typically derived from one of a selection of sources, with higher-cost and lower-quality options (including tanker truck delivery or local surface water) supporting more-expensive (bore well) or higher-quality but intermittent supplies (e.g., municipal water) as needed to supply consistent water delivery to the home. All of these sources fall under 5,000 mg/L total dissolved salts (TDS), the salinity threshold where ED delivers comparable water quality with reduced energy consumption and water waste to RO.

POU purifiers typically are a consumer product; hence, low manufacturing capital cost is a key driver to ensuring uptake. The average POU purifier in India cost US$158 in 2018. While the primary customers in India tend to be upper middle-class households with higher income levels, capital cost remains the most important factor in whether a device will be successful when considering the design of an ED system for Indian POU application.

SUMMARY

A system and method for desalination using electrodialysis are described herein, where various embodiments of the apparatus and methods may include some or all of the elements, features and steps described below.

An electrodialysis desalination device, as described herein, includes a first electrode including a first-stage side; a second electrode including a first-stage side; and a first stage between the first-stage side of the first electrode and the first-stage side of the second electrode. The first stage includes at least one first-stage cell pair positioned between the first-stage side of the first electrode and the first-stage side of the second electrode, and each cell pair includes a pair of first-stage selectively permeable ion-exchange membranes with alternating selectivity that define first-stage channels on opposite sides of each first-stage membrane for respective flows of a first-stage diluate stream and a first-stage concentrate stream. A single pump is configured to pump the diluate streams and the concentrate streams through the first stage. A similar second stage, as well as additional stages, can be included and configured to receive the diluate and concentrate streams from the first stage to perform further desalination via electrodialysis.

Where additional stages are incorporated into the system, additional "hydraulic" stages can be added by including additional paths for additional passes of the streams between membranes in or more cells of each stage between the electrodes; optionally, additional electrodes can be added to the stack (with alternating charges, +, −, +, −, etc., applied to respective electrodes in the sequence) with the electrodes separating some or all of the different hydraulic stages. In any of the designs described herein and depending on the objectives of the particular application to which it is directed, additional stages can readily be added by adding additional membranes and channels for routing the streams back between the additional membranes in the stack; and an additional electrode can likewise be added to the stack beyond each new hydraulic stage.

The architecture and design presented herein can provide for a cost-optimal continuous ED stack, which can be targeted at the Indian POU market, though it may also be employed across the globe. Through a simplified system architecture and detailed parameterized survey of the designs space, the proposed design can have a capital cost below the retail price for current RO POU purifiers on the Indian market. At the same time, it provides a significant new value proposition for a region that is facing water scarcity: conserving up to 90% of the feed water to the system. Further, the design provides continuous delivery of water, improving upon previously proposed POU ED systems that have primarily focused on batch water delivery. Accordingly, the two-stage continuous ED system described herein can address the requirements of markets, such as the Indian market, while providing a higher water recovery than existing POU reverse osmosis products. Therefore, the two-stage continuous ED system described herein shows promise for being a cost-competitive but water-efficient alternative to POU RO in India and elsewhere.

Figure 1:
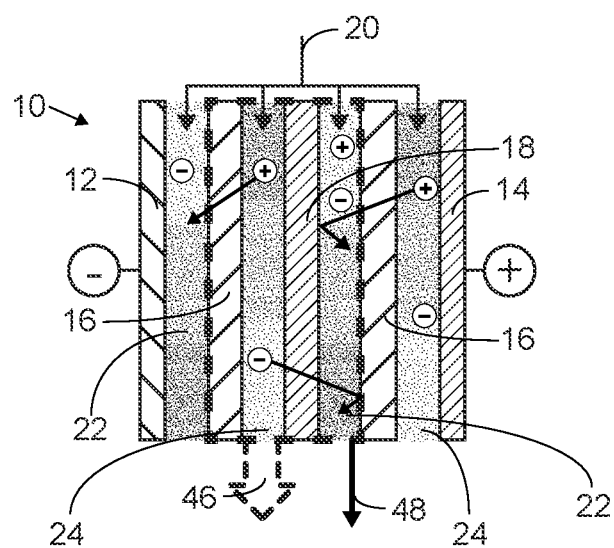
FIG. 1 schematically illustrates an electrodialysis (ED) apparatus 10 with alternating selectively permeable membranes 16 and 18 that enable ion collection and depletion within the flow during operation. Each cell pair (denoted by the dotted line) includes a pair of a cation exchange membrane 16 and a neighboring anion exchange membrane 18 positioned between an anode 14 and a cathode 12 to facilitate the separation of ions from the saline feed.

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within +10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Nomenclature:

$C_{conc}$ Concentration of concentrate channel
$C_{bulk,dil}$ Bulk concentration of diluate channel
$C_{wall,dil}$ Wall concentration of diluate channel
$E_{el}$ Potential drop across electrode [V]
$E_{mem}$ Potential drop across membranes [V]
f Friction factor
h Channel height [m]
$i_{lim}$ Limiting current density [A/m$^2$]
L Flow path length [m]
N # Number of cell pairs in stage number: #
P Pressure
$Q_{cp}$ Cell pair volumetric flow rate
$R_c$ Concentrate resistance [Ω-m$^2$]
$r_{ilim}$ Maximum ratio of applied to limiting current
$R_{mem}$ Membrane resistance [Ω-m$^2$]
$u_v$ Void channel velocity
V # Voltage applied to stage number: #
W Flow path width [m]
ρ Density of feed water Electrodialysis Devices:

Electrodialysis (ED) is a membrane desalination process in which salt transport is driven by applying an electric potential, as shown via the illustration of an ED stack 10 in FIG. 1, wherein an aqueous saline feed 20 flows between a pair of electrodes (i.e., a cathode 12 and an anode 14). The applied current acts on charged ions, moving cations and anions in opposite directions. Selectively permeable membranes (i.e., cation exchange membranes 16 and anion exchange membranes 18) separate the flow to produce diluate channels 22 from which flows diluate streams 46 (with reduced ion content) and brine channels 24 from which flow saline brine concentrate streams 48 (with increased ion content extracted through the membranes 16 and 18).

Previous work demonstrated the feasibility of implementing ED within domestic purifiers when operated to deliver water in batches to a storage tank [see K. Nayar, et al., "Feasibility Study of an Electrodialysis System for In-Home Water Desalination in Urban India," 2 Dev. Eng. 38-46 (December 2016); and S. Thampy, et al., "Development of Hybrid Electrodialysis-Reverse Osmosis Domestic Desalination Unit for High Recovery of Product Water," 282 Desalination 104-108 (2011)]. However, while these systems could meet the required water production rate at quality, there are disadvantages to the batch architecture. First, it utilizes more valving to enable voltage reversal (which decreases membrane scaling). Additionally, the tanks required for batch operation require significant volume. Most importantly, the user experience is unfamiliar to current users; a batch system does not provide a continuous supply of desalinated water. Industrial implementations of ED frequently operate with a continuous production of water, achieving a target salinity through staging multiple modules in series; however, this architecture is not known to have been examined for POU applications.

Below, we provide a brief overview of the ED process and an exemplary system design before delving into our methodology for sizing the system for minimum cost and discussing a derived design.

Electrodialysis Overview:

As shown in FIG. 1, a full ED module 10 or 'stage' comprises repeating units of flow channels 22 and 24 sandwiched between ion-exchange membranes 16 and 18 with alternating selectivity. This unit (shown via the dashed line) is called a cell pair and comprises one cation-exchange membrane (CEM) 16 and one anion-exchange membrane (AEM) 18. The CEMs 16 are selectively permeable to cations, while the AEMs 18 are selectively permeable to anions; and water flows between the AEMs 18 and CEMs 16 in a mesh spacer. As ions are pulled from the saline feed by the applied potential generated by the electrodes 12 and 14, the membranes 16 and 18 block ions of the opposite charge. By alternating a CEM 16 and AEM 18 around flow spacers, channels of concentrate 24 (reject) and diluate 22 (product) water are created between the membranes 16 and 18.

In FIG. 1, it can be seen that, in the presence of an applied potential generated via a voltage differential applied to the cathode 12 and anode 14 by a voltage source, ions in saline water will move towards the anode 14 or cathode 12 until they encounter an ion-exchange membrane 16/18 selective for the opposite charge. As a result, ions are driven out of the product (diluate) channel 24 and accumulate in the concentrate channel 22, from which brine/concentrate 48 is rejected.

The rate of desalination within an ED stack 10 is determined by the geometry and configuration of the cell pairs. Changing flow path geometries [i.e., length, L (measured horizontally in the orientation of FIG. 1); width, W (measured along a normal axis into the perspective of FIG. 1); and height h, measured vertically in the orientation of FIG. 1)] will affect the linear flow velocity of the aqueous streams within the stack 10, which results in changes to the Reynolds number and relative advective, viscous, and diffusive mixing within the channels 22 and 24. The diffusing and mixing of ions within the channels 22 and 24 limit the desalination rate. The number of cell pairs, N, will influence the overall power required for desalination, as each channel 22/24 and membrane 16/18 acts as a resistive element in the circuit.

Figure 2:
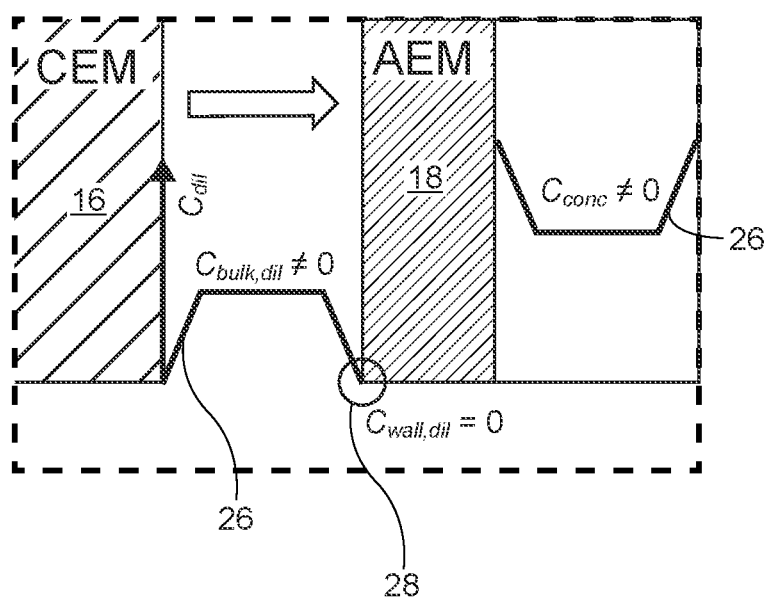
FIG. 2 plots the salt concentration 26 across the cell pair shown in FIG. 1, wherein the applied current creates regions near the membranes 16 and 18 where the salt concentration 26 is significantly lower than it is in the bulk of the flow path between the membranes 16 and 18.

An important parameter in ED is the limiting current density, ilim [A/m$^2$], which is the diffusion-limited rate of ion transport, above which ions are removed from the boundary layers of the diluate stream in diluate channel 22 faster than they can be replenished by either diffusion or water mixing. Current densities greater than ilim cause ion depletion at the membrane-diluate interface, as shown in FIG. 2. I.e., the salt concentration at the membrane interface 28 reaches zero. Once the boundary layer is depleted of ions, water-splitting begins to occur (i.e., water hydrolyzes into H$^+$ and OH$^-$ to provide ions to carry the current that the applied voltage mandates), which decreases system efficiency and can promote scale formation (primarily precipitating CaCO$_3$ as basic regions are formed due to shifts in pH). In order to avoid these phenomena, conventional ED operation requires that i<$i_{lim}$. As mineral scale precipitates and accumulates in the system, the membranes 16 and 18 may become ineffective, producing reduced flow volume or reduced ion permeability. The current-density limit is often implemented by requiring that the ratio of applied to limiting-current density not exceed $r_{ilim}$, the maximum allowable ratio.

Figure 3:
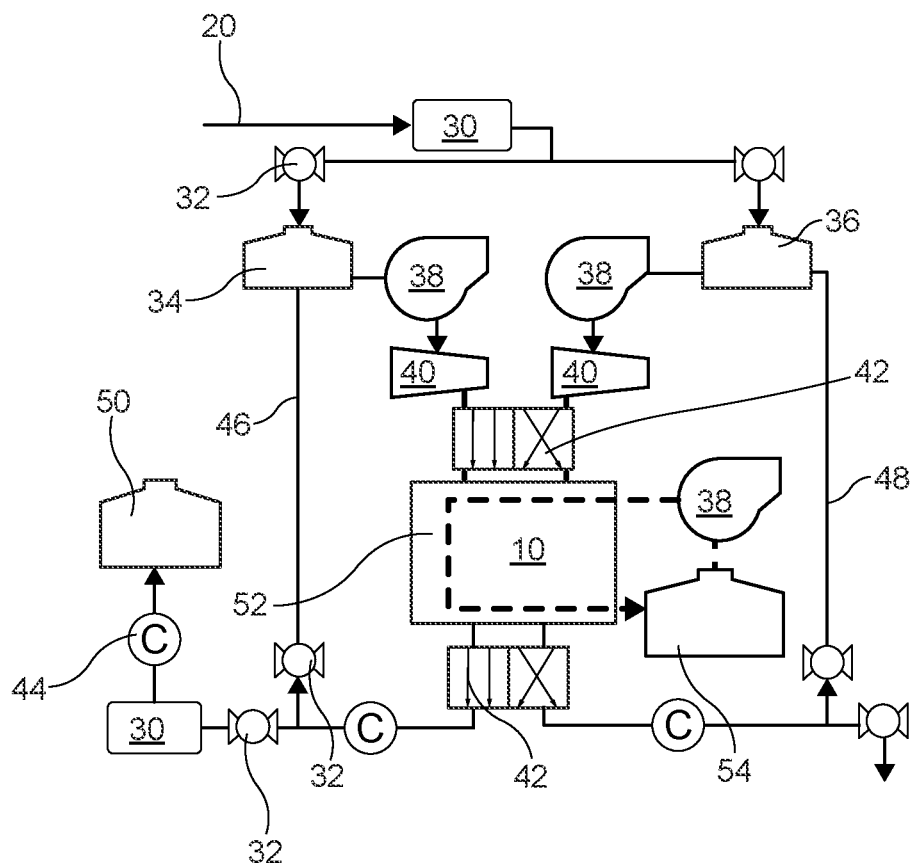
FIG. 3 is a flow schematic of a conventional batch ED architecture, wherein the pumps 38 control the bulk flow of the aqueous streams and overall recovery of the system, while a third pump 38 is used for the electrode rinse 52.

Conventional Architectures:

A conventional batch-ED architecture is shown in FIG. 3, where diluate 46 and concentrate 48 recirculate through parallel flow loops until the desired salinity is achieved and are then transferred to respective storage tanks 50 (or disposed of) in one "batch". A respective tank 34/36 and pump 38 are used for each flow stream in this configuration. Two pumps 38 control the bulk flow and overall recovery of the system 10, while a third pump 38 is used for the electrode rinse 52. The associated pump, valves and storage tank for an acid-clean system are not depicted. Also shown are filters 30 (for the saline feed 20 and for the diluate stream 46 output to the product storage 5o), as well as valves 32, pressure regulators 40, reversal valve networks 42, and an electrode-rinse tank 54. The flow distribution of the diluate stream 46 and the concentrate stream 48 in the reversal valve network 42 is shown in FIG. 4.

Figure 5:
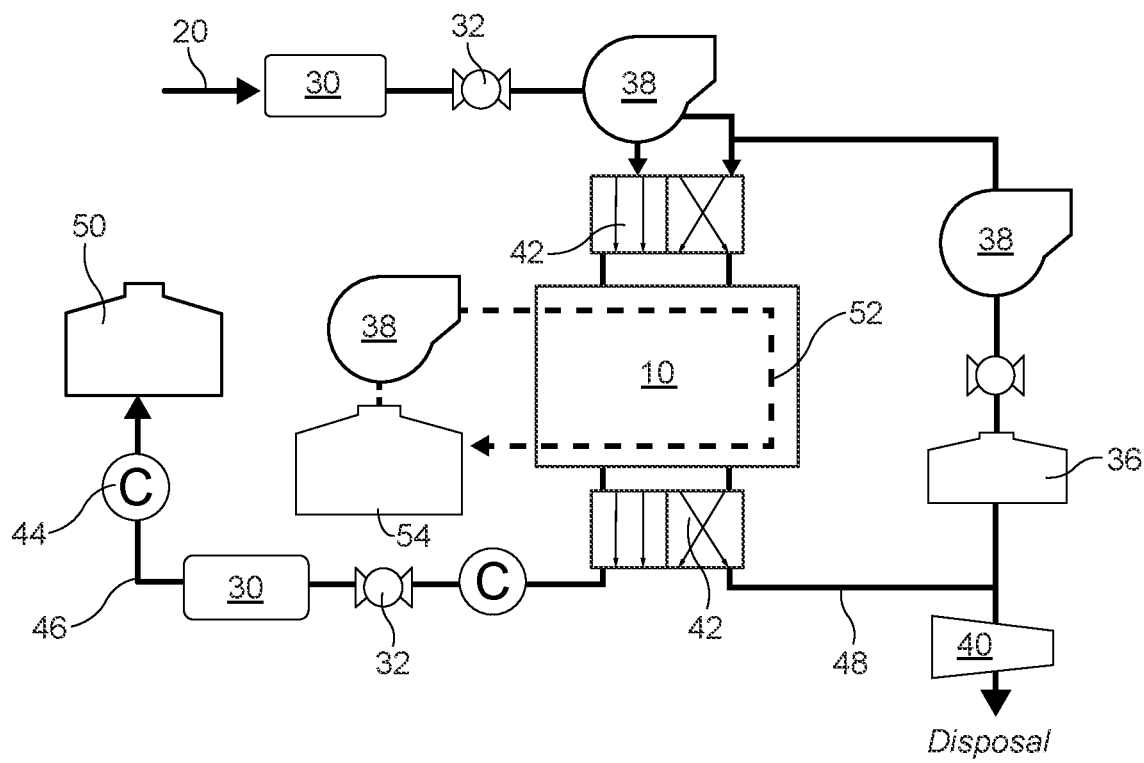
FIG. 5 is a flow schematic of a conventional continuous feed-and-bleed ED architecture, including a plurality of pumps 38 for respective flows in the system.

By contrast, FIG. 5 depicts a conventional architecture that enables continuous water delivery in a feed-and-bleed configuration. In this variant, the product tank 50 is continuously filled when the system is running. Concentrate 48 is recirculated in a small amount ("bled" back to the system) in order to achieve a recovery ratio >50%. Again, an associated pump, valves and storage tank for an acid clean system are not depicted.

Figure 4:
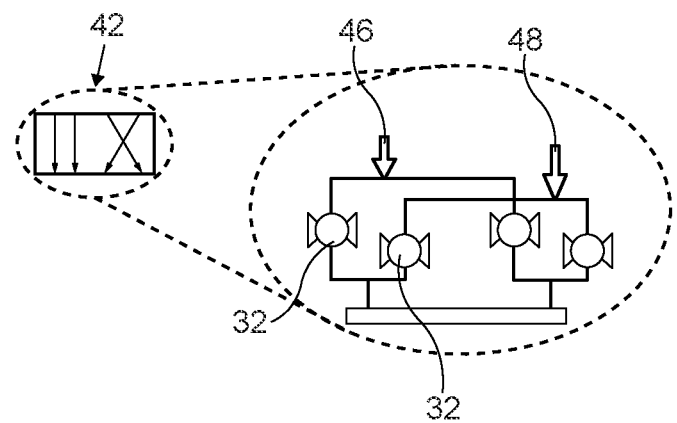
FIG. 4 is an illustration of the flow paths in the reversal valve network 42 for the diluate flow 46 and concentrate flow 48, as governed by valves 32.

Both architectures depicted include reversal valve networks 42 to allow for reversal of the diluate and concentrate streams (see FIG. 4). Electrodialysis reversal (EDR) is a common tactic used to prolong the life of the membranes 16 and 18 (see FIG. 1) by periodically reversing the electrode polarity (inverting the anode 14 and cathode 12 of FIG. 1). This inversion between operational 'positions' switches which channels 22/24 of the stack 10 collect diluate and concentrate and allows for mineral deposits that may have begun nucleation in the concentrate stream to be dissolved away in the unconcentrated diluate stream. Specialized valves exist for performing this operation on industrial-scale systems; however, similar flow diverters are not common at the POU scale flow rates; instead, we used the solenoid-valve network referred to as the reversal valve network 42, which is shown in FIG. 4.

Figure 6:
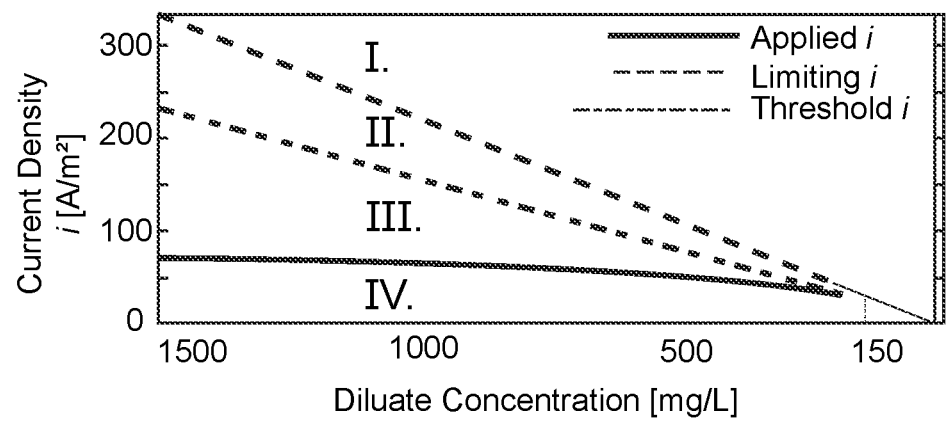
FIG. 6 plots the applied current density 60 and other current densities of interest over the course of desalination for a single pass through an ED stack, where the limiting current density 56 and corresponding 0.7-safety-factor threshold 58 decrease in the diluate stream as the diluate concentration drops. The maximum current that can pass through a stack can be seen to be limited by the region of lowest diluate concentration, occurring at the end of the flow path. Region I is masked given that the limiting current, $i_{lim}$, is exceeded in this region.

Effects of Staging:

Ion concentration in the diluate stream decreases over the length of the flow path in the diluate channel 22, resulting in a proportional decrease in the limiting current density 56, $i_{lim}$, (see FIG. 6). Region I, above $i_{lim}$, falls outside of the operational limits of the system due to the water-splitting phenomenon, discussed above. By imposing a safety threshold 58, $r_{ilim}$, we also prevent operation in Region II. The solid line (representing applied current) 60 represents desalination at a voltage, V. This voltage is, therefore, limited by the maximum applied current 60 at the lowest concentration of the stage. This imposed limit results in a large amount of wasted desalination potential (FIG. 6, region III) where the concentration could enable higher currents to be applied. Higher applied current density is desirable because it results in more efficient use of the ion-exchange material, driving material needs lower and material costs down.

Figure 7:
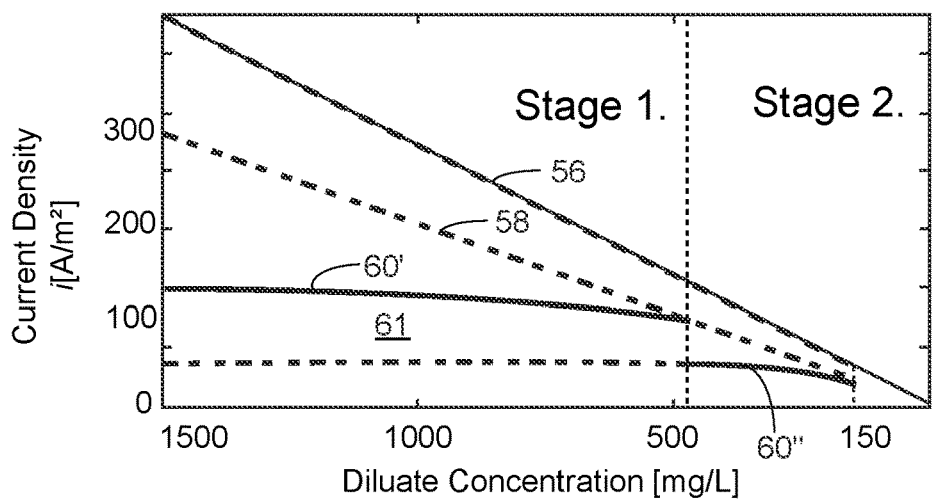
FIG. 7 plots the applied current density 60 and other current densities of interest, including the limiting current density 56 and the corresponding 0.7-safety-factor threshold 58 over the course of desalination through two stages of ED with independently controlled voltages in the two stages that allow the system to achieve higher desalination without reaching the limiting applied current density, wherein the benefits gained by using the two stages rather than one is shown via region 61.

Two-Stage Continuous Stack:

In this analysis, we examine a two-stage configuration where the applied potential can be independently controlled for two sequential stages (see FIG. 7). It can be seen in FIG. 7 that the area 61 represents an increase in current density provided by the addition of a second stage. This increase achieves the goal, described above, of operating with the applied current 60 closer to $i_{lim}$ 56 as a way to increase efficiency.

FIGS. 6 and 7 plot the current densities of interest over the course of desalination. For a single pass through the ED stack 10, as shown in FIG. 6, the limiting-current density 56 (and corresponding 0.7 safety factor threshold 58) decreases in the diluate stream. The maximum current 60 that can pass through a stack can be seen to be limited by the region of lowest diluate concentration, occurring at the end of the flow path. Region I is masked given that $i_{lim}$ is exceeded in this region. As shown in FIG. 6, adding two stages with independently controlled voltages allows the system to achieve higher desalination without reaching the limiting applied-current density.

Figure 8:
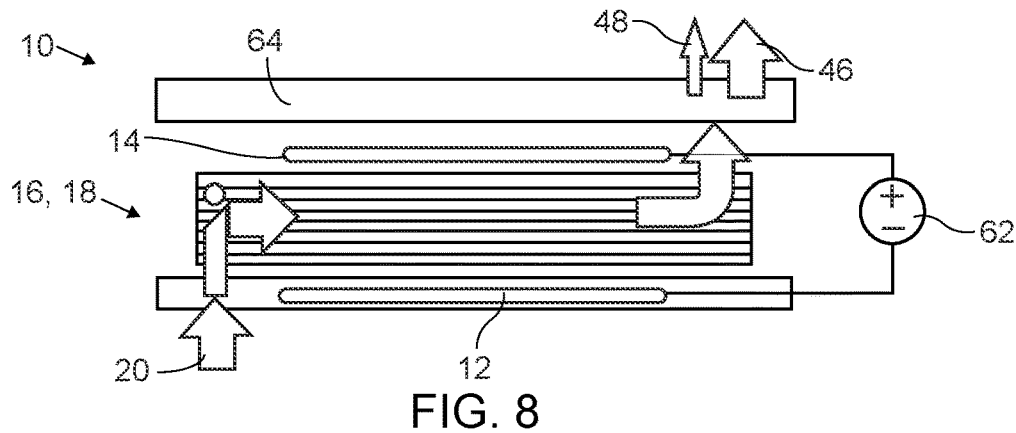
FIG. 8 shows the flow path for a saline feed 20 through a single stage ED stack 78, which produce a diluate stream 46 and a concentrate stream 48.

Flow of a saline feed 20 through a single-stage ED stack 10 is shown in FIG. 8. As seen therein, the feed 20 flows through an opening in a housing 64 in which the cathode 12 is embedded. The feed 20 flows through respective channels in the stack to produce alternating diluate and concentrate streams as ions are selectively extracted by ion-selective membranes in the stack 10. An anode 14 is provided on the opposite side of the stack 10 from the cathode 12; and both electrodes 12 and 14 are electrically coupled with a voltage source 62 to provide a voltage differential across the stack 10. The diluate streams 46 and concentrate streams 48 are respectively aggregated and extracted from the stack through the housing 64.

Figure 9:
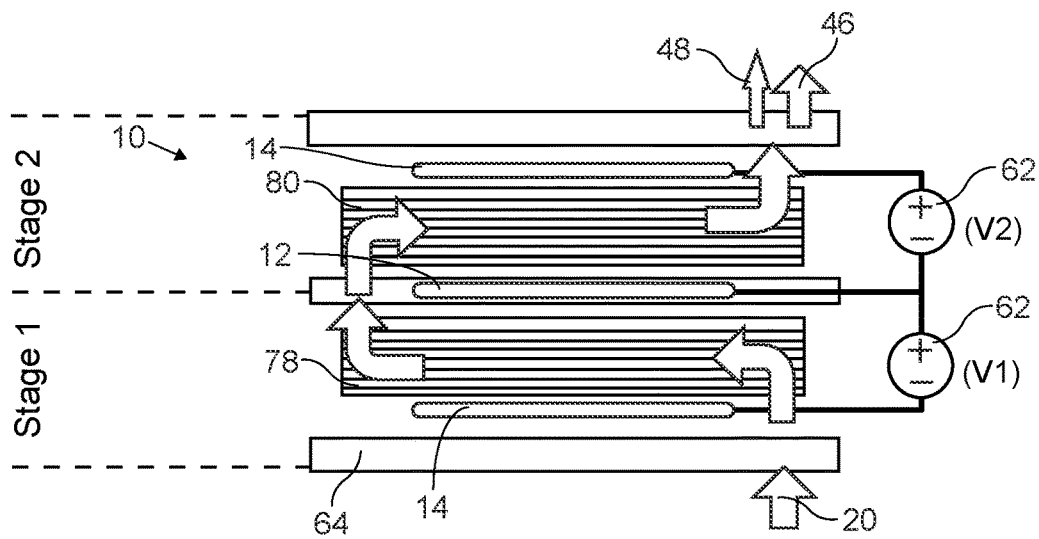
FIG. 9 shows the flow path for a saline feed 20 through a two-stage ED stack, wherein the stages 78 and 80 share a center electrode 12, reducing the capital cost of the system.

An additional strategy to reduce capital is proposed through a sharing of a center electrode (e.g., cathode 12) between both hydraulic stages of a two-stage design (see FIG. 9). Sharing the center electrode 12 in a two-stage stack, as shown in FIG. 9, reduces the capital cost of the system. The flow direction is mirrored from the first stage (N1) 78 to the second stage (N2) 80. Bolded items (N1, N2, V1, V2) are variable parameters of the system. Different field strengths can be applied to each hydraulic stage 78/80 using the two additional electrodes (e.g., anodes 14) at the ends of the stack. By providing a voltage differential between the top anode 14 and the central cathode 12 that differs from the voltage differential between the bottom anode 14 and the central cathode 12 Within each stage 78/80, the number of cell pairs, N, are further allowed to vary between the two stages 78 and 80, therefore allowing for different flow channel velocities in the hydraulic stages 78 and 80. Accordingly, the flow rate and current in each stage can be independently controlled to reach a target salinity without reaching the limiting conditions.

Figure 10:
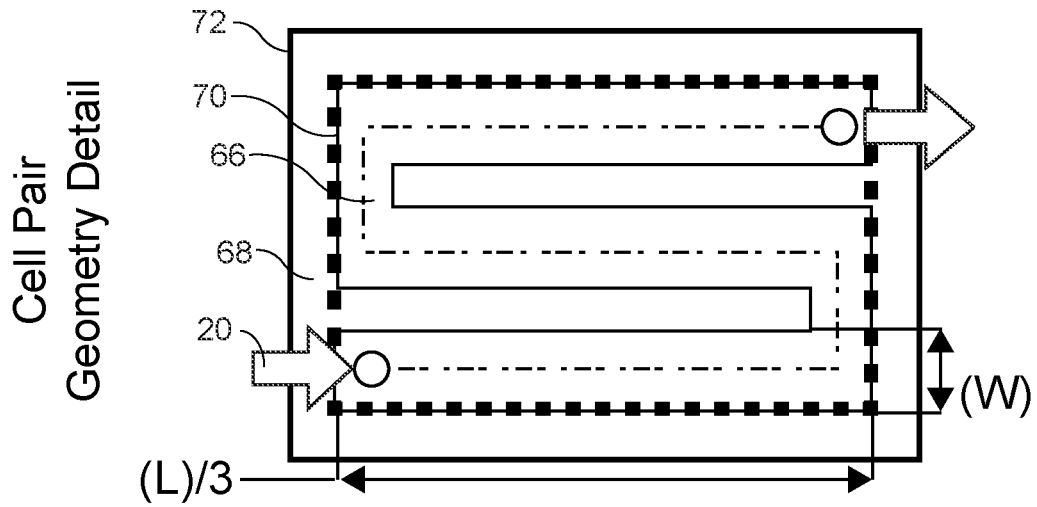
FIG. 10 shows a single cell pair, wherein the flow path 66 is tortuous in order to conserve area. The membrane and spacer have the same outer edge 72, but the electrode is only in the area of flow.

The length of the flow path, L, and the channel width, W (see FIG. 10), are held constant to decrease the number of different components in the assembly. The shape of the flow path 66 seen in FIG. 10 is made possible through the addition of a flow spacer that includes gasket area to prevent water flow outside of the specified region. Within a single cell pair, the flow path is tortuous in order to conserve area. The membrane and spacer have the same outer edge 72 but the electrode (the edge 70 of which is highlighted) is only required in the area of flow. The gasket area 68 is also shown.

Figure 11:
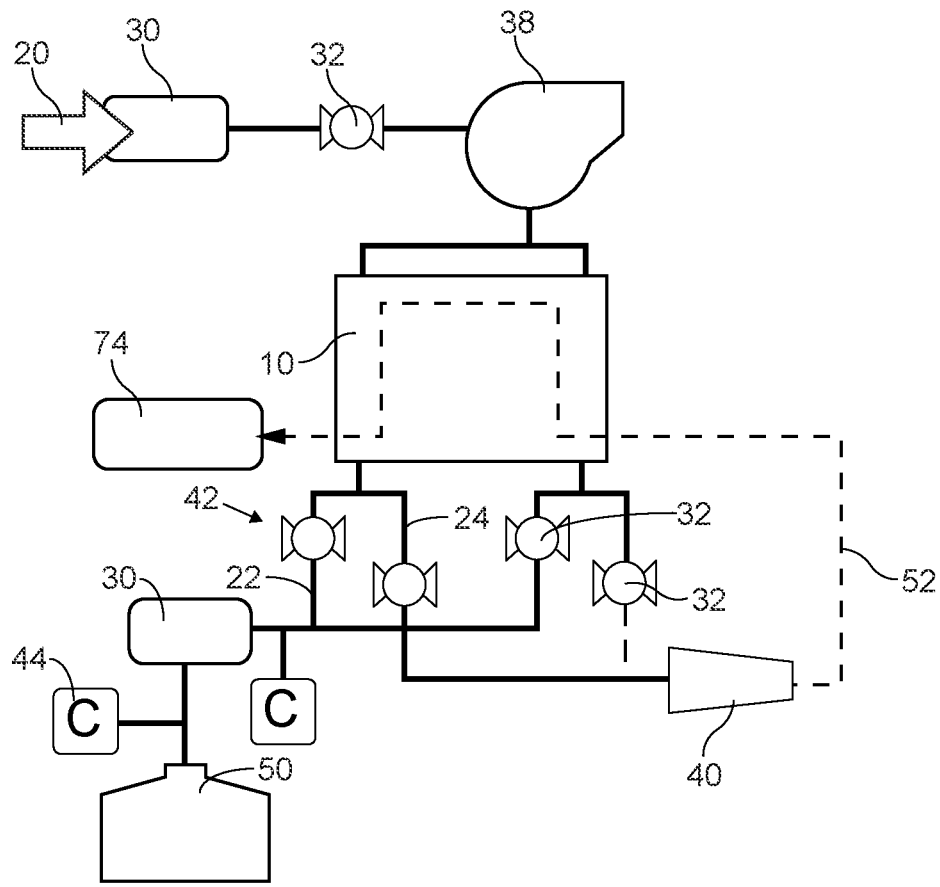
FIG. 11 illustrates a system with a two-stage ED stack 10 with a single pump 38 for generating each of the fluid flows through the system. The two-stage stack 10 relies on a pressure regulator 40 on the outlet to achieve recovery over 50%. The stack 10 performs the desalination step of the purification process and is supported by additional filters, valves and pumping systems.
Figure 12:
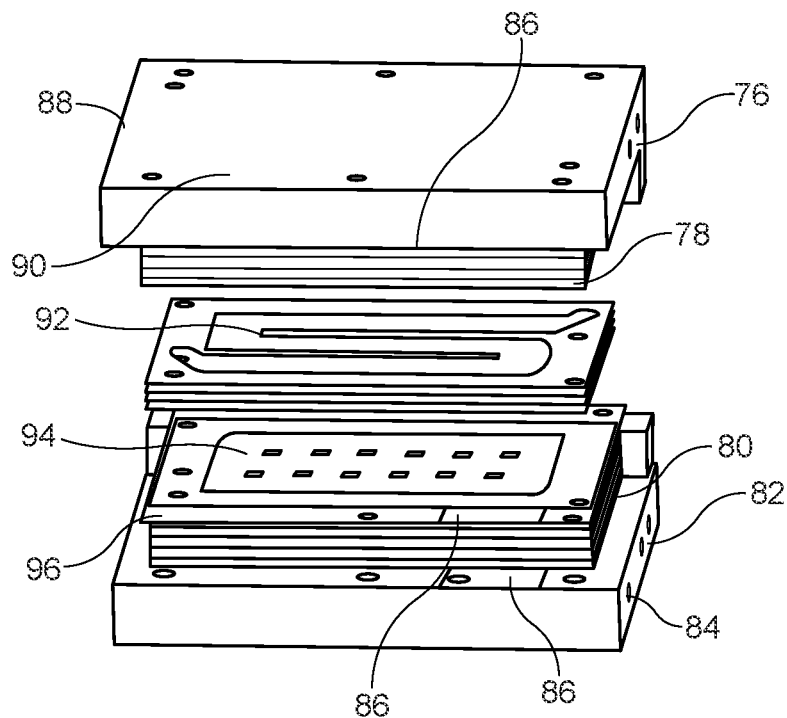
FIG. 12 is an exploded perspective view of a two-stage ED stack 10.

System Architecture:

The two-stage stack 10, described above, would be a single component of the POU water-purification system, analogous to the RO filters used in current systems. FIG. 11 depicts how this stack 10 can be positioned into the purifier architecture with a single pump 38. As shown in FIG. 11, the two-stage stack 10 relies on a pressure regulator 40 on the outlet to achieve recovery over 50% by using back pressure on the system to slow concentrate flow. This architecture is enabled by the slower flow rates, the over-all lower pressure drops, and a tolerance for differential pressure. The stack 10 performs the desalination step of the purification process and is supported by additional filters 30, valves 32, and electrical systems (to govern actuation and operation of the hydraulic network). The "pressure regulator" 40 is alternatively referenced herein as a "flow restrictor."

For this design, it is assumed that the recovery ratio is achieved by assuming the flow rates in the brine channel 24 and in the diluate channels 22 are independent. This independence is in contrast to the industrial norm of a feed-and-bleed system that maintains equal flow rates by recirculating brine in order to preserve volume but allow for water recovery over 50%. The independent flow rates can be achieved in practice through inclusion of a flow restrictor 40 on the brine outlet (as a channel component) to apply a back pressure that slows brine flow. The flow restrictor 40 and other aspects of the channels can be configured to create a flow rate for the diluate stream(s) through the channels that is at least 10 times as great as the flow rate for the concentrate stream(s) through the channels. Additionally, conditions may exist where a flow-rate differential less than lox is desired to produce a lower recovery. For example, ~66% water recovery may be acceptable in some situations, in which case the flow rate of the diluate stream would only be twice that of the concentrate. The flow restrictor 40, in particularly, can be configured to provide the desired recovery by changing the relative flow rates of the diluate and concentrate streams.

Design Optimization—Objective Function and System Constraints:

This section presents the optimization of a two-hydraulic, two-electric stage continuous ED system with a minimum capital cost. ED stack costs include fixed costs (housing, power supply, flow fixtures, etc.) and variable costs. It is estimated that 91% of the module cost is due to ion-exchange membrane and electrode costs, alone; therefore, these were the two costs considered in estimating capital costs in this analysis. The total area of the membranes and electrodes was calculated from the specified flowpath, L and W plus additional material around the path that gasket to prevent water leaking from the channel (see FIG. to).

The constraints applied to the design search were chosen to facilitate the viability of the unit as a consumer product in the Indian market. Table 1, below, lists the constraints considered in this design, along with a brief rational for each item. Throughout simulated operation, the voltage applied to each stage was allowed to vary in order to increase the applied current density.

TABLE 1

Constraints and assumptions used in the system optimization:

| Parameter | Value | Justification |
|---|---|---|
| Voltage | <24 V | Typical power supply present in existing POU purifiers |
| Pressure drop | <100 kPa | Allows for small, low cost and low electrical consumption pumps to be used |
| $r_{ilim}$ | <0.7 | Industry standard recommendations and previous work in the region |
| Inputs to the Optimization: | | |
| Feed salinity | 1,500 mg/L | Accommodate the groundwater salinity over a majority of India |
| Salt reduction | 90% | Salinity comparable to the maximum seen across packaged bottled water available in India |
| Water recovery | 90% | Highly optimistic target provides a conservative (upper bound) cost estimate |
| Flow rate | 15 LPH | Typical production rate of commercial POU RO systems in India |

Models:

When considering the overall design of an ED module, the fraction of salt removed from the feed depends on the following three factors: the residence time of the water within the system, how well the diluate channel is mixed, and the strength of the applied electric potential.

Analysis of the ED process for a given geometry was performed by leveraging previous work by N. Wright, et al., "A Robust Model of Brackish Water Electrodialysis Desalination with Experimental Comparison at Different Size Scales," 443 Desalination 27-43 (April 2018) that was modified to reflect continuous flow with varied flow velocities between diluate and brine channels. Salinity was modeled as consisting of only monovalent NaCl ions, which was shown in the same work to be a reasonable approximation at a first pass for analyzing ED stacks. Properties of the key parameters used in the modeling are summarized in Table 2, below.

TABLE 2

Parameters of the spacer used in simulation:

| Parameter | Value | Justification |
|---|---|---|
| Spacer characteristics: | | |
| Channel height (h) | 0.350 mm | Parameters of commercial unit: PCCell GmbH (Heusweiler, Germany), model 64-002 |
| Open-area fraction | 0.6 | |
| Estimated void fraction | 0.62 | |
| Membrane characteristics: | | |
| Resistance ($R_{mem}$) | 40 Ω-cm² | Experimentally determined safety factor over values reported by Ortiz, et al.[1] |
| Potential drop ($E_{mem}$) | Calculated | Summation of the junction and Donnan potentials[2] |
| Cost per m² | US$40 | Previous quote[3] |
| Electrode characteristics | | |
| Potential drop ($E_{el}$) | 1.4 V | Known metric for redox reaction occurring |
| Cost per m² | US$2,000 | Previous quote[4] |

[1] J. M. M. Ortiz, et al., "Brackish Water Desalination by Electrodialysis: Batch Recirculation Operation Modeling," 252 J. Memb. Sci. 65-75 (2005).
[2] M. Fidaleo, et al., "Electrodialytic Desalting of Model Concentrated NaCl Brines as Such or Enriched with a Non-Electrolyte Osmotic Component," 367 J. Memb. Sci. 220-232 (2011).
[3] Hangzhou Iontech Environmental Co. Ltd, IONSEP Membranes, Zhejiang, China (2014).
[4] Baoji Changli Special Metal Co. Ltd, Platinized Titanium Anode, Shaanxi, China (2014).

Voltage and pressure drop are of particular interest in this study; hence, the relevant equations are summarized here. The voltage drop across each stage was estimated using the following equation:

$$V = E_{el} + N[E_{mem} + i(R_d + R_e + R_{mem})]. \quad (1)$$

The pressure drop, $\Delta P$, is predicted from the Darcy-Weisbach equation of flow between two parallel flat plates, as follows:

$$\Delta P = \frac{\rho f L u_v^2}{4^h}. \quad (2)$$

The friction factor was determined using the method of Ponzio, et al., "Experimental and Computational Investigation of Heat Transfer in Channels Filled by Woven Spacers," 104 Int. J. Heat Mass Transf. 163-177 (2017), based on the Reynolds number calculated using the void channel velocity, $u_v$ (without spacer porosity included).

Design Domain:

The minimum capital cost design was determined through a scatter search. In structuring the simulations, geometric properties of the path were varied through specified ranges, and the model described above was used to calculate the voltage required in each stage to achieve the desired salt reduction. The resolution for the widths was chosen based on limitations of the fabrication process for flow spacers within the lab setting, where widths have been demonstrated to be controlled within 2 mm.

Geometric inputs (e.g., for width, W; length, L; and cell pair counts, N1/N2) are selected over a range of inputs and fed to the computational model that returns system characteristics of interest for each design. Width was resolved at 0.5 cm from 1.5 to 2.5 cm; length was resolved at 1 cm from 40 to 60 cm; N1 was assessed from 8 to 22 cell pairs; N2 was assessed from 6 to 11 cell pairs for N1=13 and rescaled as necessary for N1 values at extremes of the range.

The product salinity, $C_{prod}$, and intermediate salinity, $C_{int}$, were both specified as inputs to the model. The intermediate salinity was fixed as the geometric mean of $C_{feed}$ and $C_{prod}$, as described by Equation 3, below. This salinity was determined analytically from methodology similar to that presented by Shah, et al., "Using Feed-Forward Voltage-Control to Increase the Ion Removal Rate during Batch Electrodialysis Desalination of Brackish Water," 457 Desalination 62-74 (2019), and modified to assess the desalination potential in a single pass through the continuous system. This analytical method was validated using the system simulation in the Validation, section, below.

$$C_{int} = \sqrt{C_{feed} C_{prod}} \quad (3)$$

Results and Discussion:
Optimal Design:

The minimum capital-cost design that satisfied all constraints specified in Table 1 had a capital cost of US$106 (membranes and electrodes only). Table 3 summarizes the width and length of the flow path and the number of cell pairs in each stage.

Visualization of Constraint Boundaries:

To further understand the cost-optimal design, FIGS. 13-17 can be used to connect how changes in geometry over the domain affect key outputs. For this visualization, N1 is fixed at 13 cell pairs in the first stage, and width is fixed at 2 cm, while the length and N1 are varied. The visualization is a useful tool when considering how variations in external constraints, such as the maximum available voltage or pumping pressure, may change both the shape and cost of the optimal design.

Figure 13:
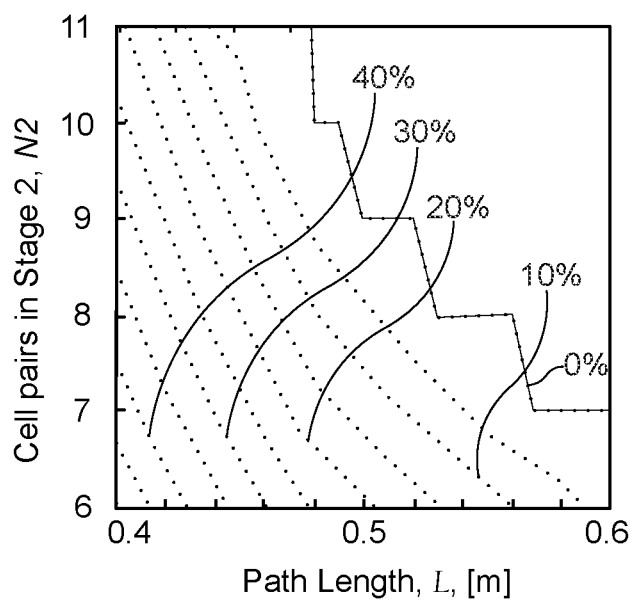
FIG. 13 is a plot for a system with a flow-path width of 20 mm and with 13 cell pairs in the first stage, wherein the portion of the flow path over the 0.70 current limit is plotted (as percentages) as a function of the number of cell pairs (y axis) versus path length in meters (x axis), which shows that increasing the active area decreases the amount of flow path over the applied current threshold.

Discussion of Individual Outputs:

The first parameter considered when exploring the design space was how the applied current density was affected by path length and cell-pair counts. This is a technical constraint imposed on the system; and, therefore, the boundary is immobile in the case of potential system improvements by the designer. FIG. 13 shows the permissible and impermissible (shaded) regions of the design space as bounded by the constraint on $r_{ilim}$. For the same geometry, increasing the N2 cell pair count (moving up the vertical axis) decreases the amount of the path over $r_{ilim}$ by slowing the flow velocity. This type of system modification is possible to implement after a stack has been designed and is a notable point of flexibility.

Figure 14:
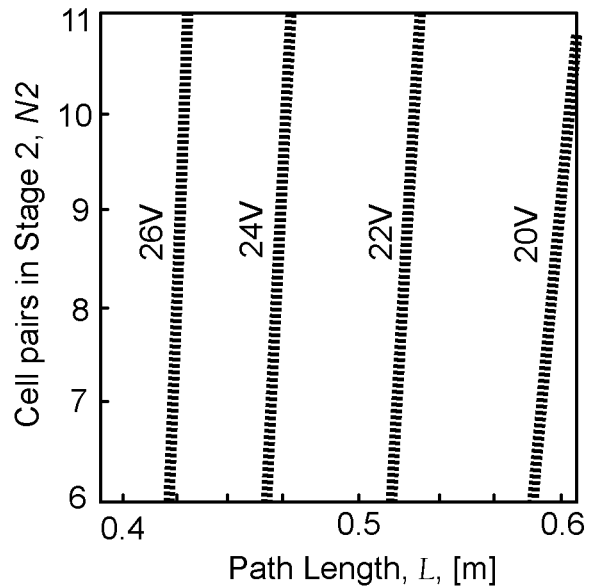
FIG. 14 is a plot, for the system described with respect to FIG. 13, of voltage as a function of the number of cell pairs (y axis) versus path length in meters (x axis), showing that voltage decreases with lower cell-pair series resistance or increased path length.

As shown in FIG. 13, increasing the active area decreases the amount of flow path over the applied current threshold. As shown in FIG. 14, voltage decreases with lower cell pair series resistance or increased path length. Further, FIG. 14 shows that as the active area per cell pair increases with growing length, the voltage required to achieve a target concentration also decreases. This decrease in required voltage occurs because a lower corresponding applied current density is required to remove the same salt. The slight vertical increase in voltage is required to overcome the increasing resistance with more cell pairs added to the second stage.

Figure 15:
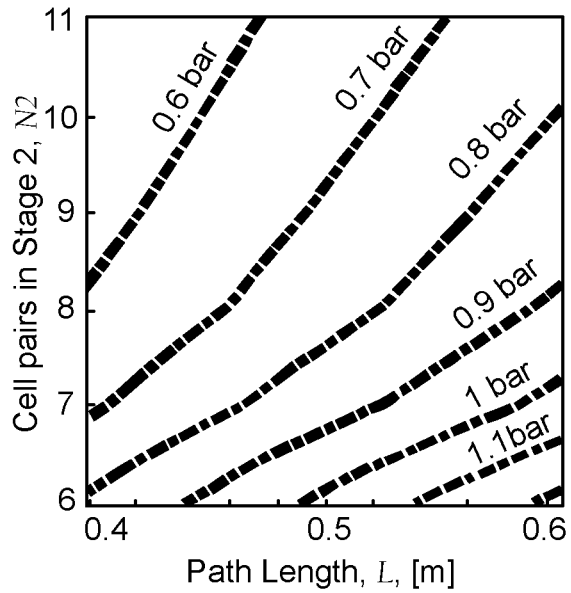
FIG. 15 is a plot, for the system described with respect to FIG. 13, of pressure drop as a function of the number of cell pairs (y axis) versus path length in meters (x axis), wherein pressure isobars show increasing pressure with geometric changes that increase channel-flow velocity.
Figure 16:
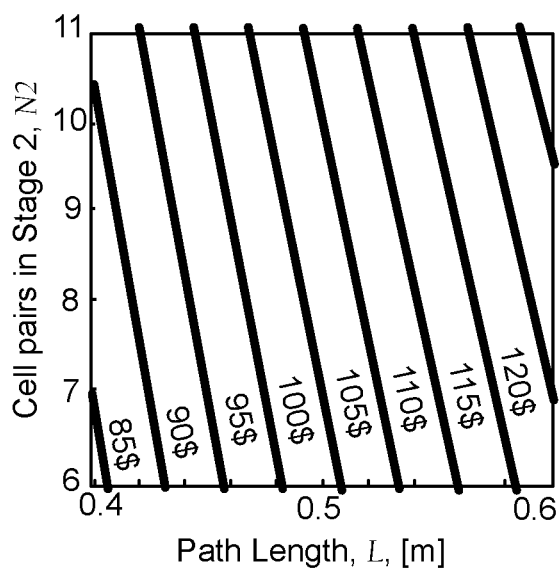
FIG. 16 is a plot, for the system described with respect to FIG. 13, of system cost as a function of the number of cell pairs (y axis) versus path length in meters (x axis), which shows that increasing the active area of a single cell pair has a greater effect on cost than increasing the number of cell pairs given the higher relative cost of the electrode compared to the membrane.

As shown in FIG. 15, pressure isobars show increasing pressure with geometric changes that increase channel flow velocity. Given the relation of pressure to $u_v^2$ (Equation 2), it is reasonable that the lines of constant pressure shown in FIG. 15 are sensitive to geometry changes that influence the void channel velocity and increase in proportion to longer flow paths or fewer channels. Again, a designer could modify a system design in this way in order to meet a change in the pressure constraint. As shown in FIG. 16, increasing the active area of a single cell pair has a greater effect on cost than increasing the number of cell pairs given the higher relative cost of the electrode compared to the membrane.

Figure 17:
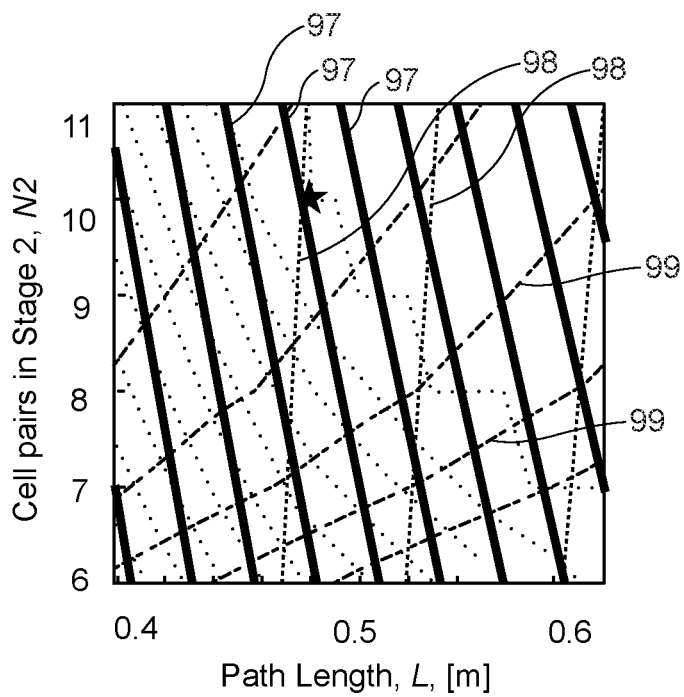
FIG. 17 is a combined constraint plot (showing capital cost plots 97, voltage plots 98, and pressure drop plots 99) for the system described with respect to FIG. 13, which shows that the optimal design (shown with a star) lies on the limiting current ratio constraint boundary. The system includes 13 cell pairs in stage 1, 10 cell pairs in stage 2, and a path length of 0.48 m and results in a capital cost of US$105.86 for membranes and electrodes.

Determination of Constraint-Bounded Minimum Cost Design:

The performance of this design relative to constraints re capital cost 97, voltage 98, and pressure drop 99 is visualized in FIG. 17. As shown therein, the optimal design (indicated with a star) lies on the limiting-current-ratio constraint boundary (i.e., the maximum current density, where 0% of flow path is over the applied current threshold). It includes 13 cell pairs in stage 1, 10 cell pairs in stage 2, a path length of 0.48 m, and a path width of 0.02 m, and results in a capital cost of US$105.86 for membranes and electrodes. The constraint limits have been overlaid onto the composite plot as shaded regions. Voltage requirements over 24 V would fall to the left-hand side of the plot, nearer the y-axis. Pressure-drop predictions over 1 bar (100 kPa) fall in the lower right portion of the plot and are also excluded. The only active constraint at this optimum is $r_{ilim}$. While the predicted voltage is close to the 24 V limit, the constraint is not considered active because there is no feasible solution with a lower capital cost if only the applied current constraint is considered (i.e., relaxing the 24 V limit does not affect the optimal design choice).

Sensitivity Analyses:
Cost Sensitivity to N1:

The easiest geometric variable to adjust after a stack has been designed and manufactured is the cell-pair count. This adjustment can be made to alter the pressure drop within the stack by varying linear-flow velocity in the system. Given this flexibility, we examined the cost-optimal configurations at N1 values that were above and below the cost-optimal point. Adding one cell pair in the first stage did not change the cost-optimal length, L, of the flow path or the number of cell pairs, N2, required in stage 2; however, it did increase the material cost by just over 1%, as can be seen in Table 3, below. Reducing the number of cell pairs, N1, in the first stage led to a cost-optimal design for meeting the performance requirements that has a slightly longer path and fewer cell pairs in the second stage. This design increased capital costs by around 1%; however, it would not be interchangeable with components from the original optimum design.

TABLE 3

Sensitivity of cost to nearby solution values. Active constraints may be in the form of voltage (V), pressure (P) or applied current (i):

| W [cm] | N1 | N2 | L [cm] | Average i [$\Omega m^2$] | Cost Increase [US$ (%)] | Active Constraint |
|---|---|---|---|---|---|---|
| 1.5 | 13 | 13 | 64 | 120 | 12.5 (11.8%) | P, V |
| 2.0 | 12 | 9 | 50 | 135 | 0.9 (0.8%) | i |
| 2.0 | 13 | 10 | 48 | 129 | Optimal | i |

TABLE 3-continued

Sensitivity of cost to nearby solution values. Active constraints may be in the form of voltage (V), pressure (P) or applied current (i):

| W [cm] | N1 | N2 | L [cm] | Average i [Ωm$^2$] | Cost Increase [US$ (%)] | Active Constraint |
|---|---|---|---|---|---|---|
| 2.0 | 14 | 10 | 48 | 122 | 1.5 (1.5%) | i, V |
| 2.5 | 15 | 11 | 39 | 110 | 2.1 (2.0%) | i, V |

Cost Sensitivity to Flow-Path Width:

Pressure loss is also highly sensitive to flow-path width for a given volumetric flow rate. In the case where pressure loss was known to be of concern, a wider path would be favorable to decrease this loss. Modifying the design width is a decision that would be made prior to fabrication, as it drastically changes the flow path form (length and cell-pair count). Here, we examined what cost increase was derived from presetting the path widths 0.5 cm above and below the determined cost-optimal width.

Figure 18:
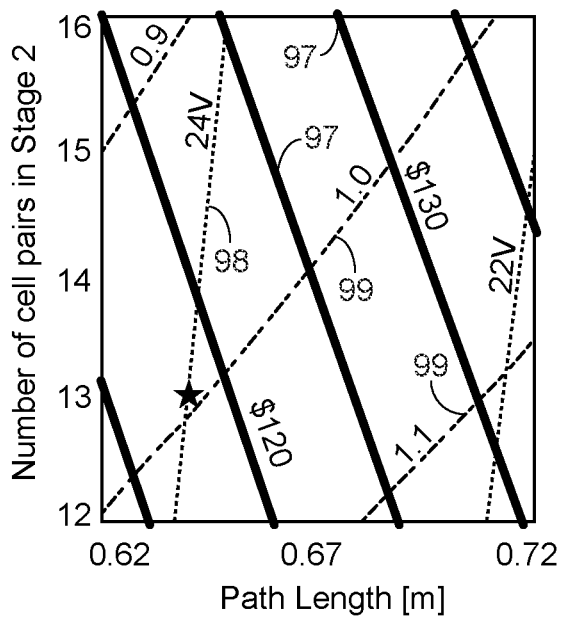
FIG. 18 is a plot of pressure drop (bar) 99, voltage (V) 98, and capital cost (US$) 97, as a function of the number of cell pairs in stage 2 versus path length for a system with a path width of 1.5 cm and 13 cell pairs in stage 1.
Figure 19:
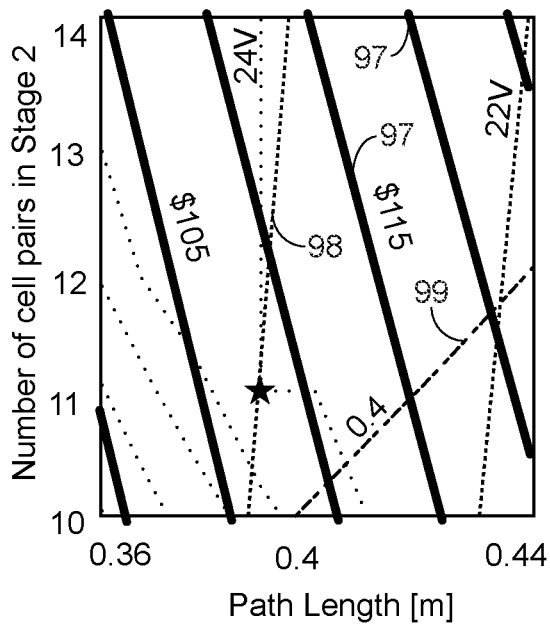
FIG. 19 is a plot of pressure drop (bar) 99, voltage (V) 98, capital cost (US$) 97, and the percent of the path over the limiting current threshold ratio, $r_{ilim}$, as a function of the number of cell pairs in stage 2 versus path length for a system with a path width of 2.5 cm and 15 cell pairs in stage 1.

Table 3, above, details the capital cost increases with these changes as well as the optimal length for each. FIGS. 18 and 19 show the constraint plots of these two configurations, including capital cost 97, voltage 98, and pressure drop 99, and offer feasible design solutions for varied path geometries. In FIG. 18, an inferior optimum is indicated (with the star), as the design is limited by imposed constraints to require more cell pairs and greater length. FIG. 19 shows lower cost options but is limited by the applied current threshold. Of note, the active constraints for the new design widths are as follows: pressure drop and applied voltage limit the design for the 1.5-cm path-width system (FIG. 18), whereas the 2.5-cm-width case is limited by the current threshold (FIG. 19).

When the flow path width is increased, $u_v$ decreases, therefore reducing the mixing within the channel and resulting in a lower limiting-current density. In order to compensate for the lower applied-current density, the total active area is increased by increasing the cell pair count or the path length. This system would operate at a lower pressure than the 2-cm-width cost-optimal design, which could be favorable in a low pressure (e.g., gravity fed) application.

In considering the case of decreased width, the maximum voltage constraint is active, forcing a longer path length in order to increase the active area of the system and to decrease the applied current density. Pressure drop is also proportional to path length (per Equation 2), so the pressure-drop constraint begins driving the addition of cell pairs in the design order to reduce the flow velocity. The capital cost of this design would be reduced if either the pressure or voltage constraints were relaxed, pointing to the potential need for a more-powerful pump or voltage supply.

Figure 20:
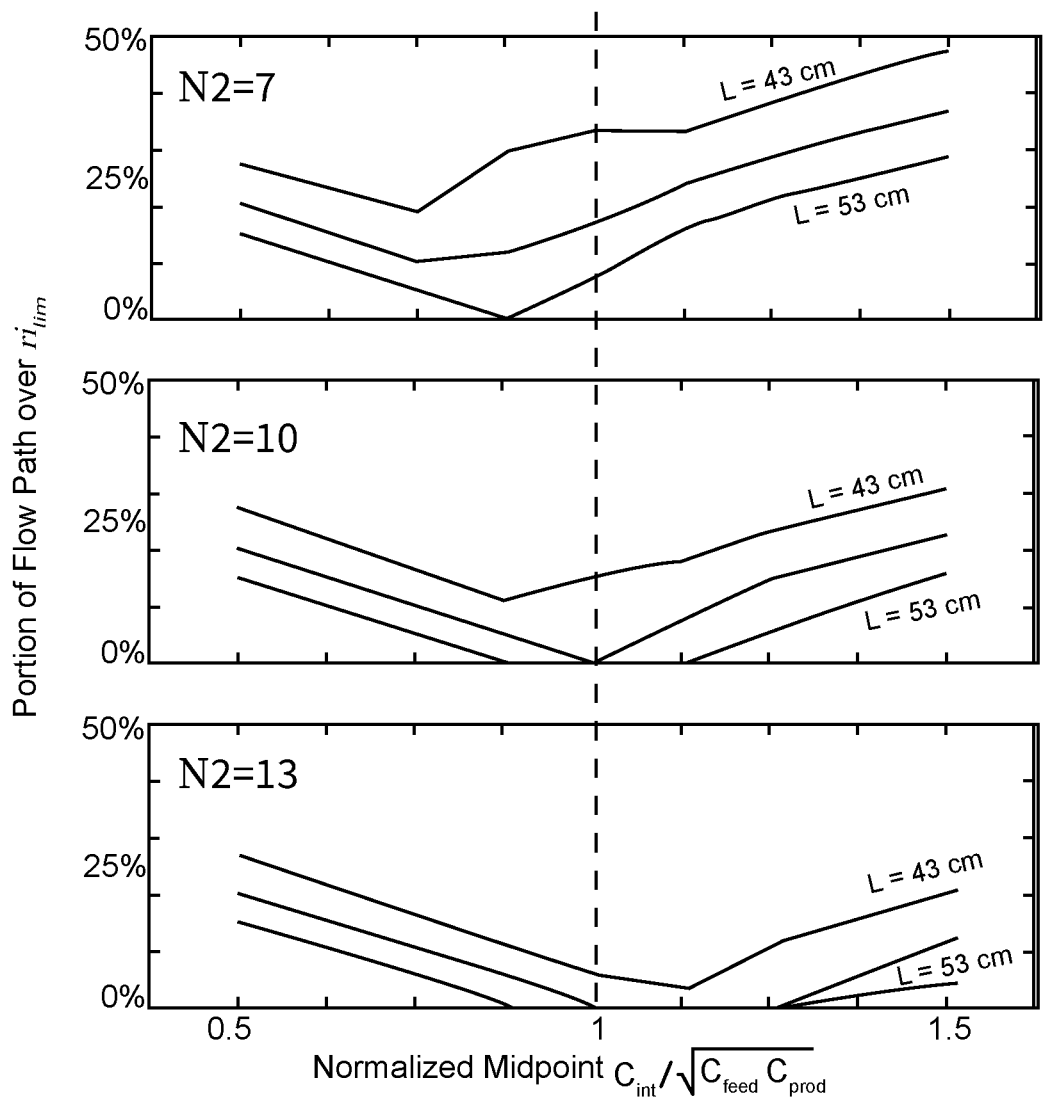
FIG. 20 includes three plots of the portion of the flow path that is over $r_{ilim}$ for different path lengths, L, as a function of a normalized midpoint, $C_{int}/\sqrt{C_{feed}C_{prod}}$, for 7 second-stage cell pairs (top), for 10 second-stage cell pairs (middle), and for 13 second-stage cell pairs (bottom). The first stage has a path width of 20 mm and includes 13 cell pairs.

Validation of Analytical Midpoint Salinity Target:

With the same feed salinity and path shape, we were able to validate the calculation from Equation 3, above, which predicted that a two-stage stack will have optimal performance when the intermediate concentration is the geometric mean of the feed and product concentrations. FIG. 20 demonstrates this performance for the cost-optimal case previously described. Three path lengths, L, were tested for 7, 10 and 13 cell pairs in the second stage; and the intermediate concentration was incremented between the feed and product concentration, allowing the simulation to apply the required voltage to achieve the target intermediate and feed salinities. For a given-length flow path, L, the portion of the flow path operating above the $r_{ilim}$ threshold is maintained at 0% at all times in order to ensure increased long-term reliability in operation.

As shown in FIG. 20, manually varying the midpoint salinity shows convergence on the geometric mean as the intermediate salinity with the least amount of flow path over the current threshold across a range of path lengths, L, and number of cell pairs in the second stage, N2. Convergence is best at the optimal capital cost design (minimum membrane area). The path width was 20 mm, with 13 cell pairs in the first stage.

It can be seen in all cases that the least amount of the flow path was over the threshold applied current level when $C_{int}$ was near the geometric mean, and the correlation is best when the number of cell pairs in the second stage represents the cost-optimal design. For the higher and lower cell pair counts, the non-optimal cases favor an increased amount of desalination in the stage that has a relative membrane 'surplus', shifting the inflection point to a higher intermediate salinity in the case of greater membrane area in stage 2 (N2=13), and lower $C_{int}$ when less membrane area is present (N2=7).

Figure 21:
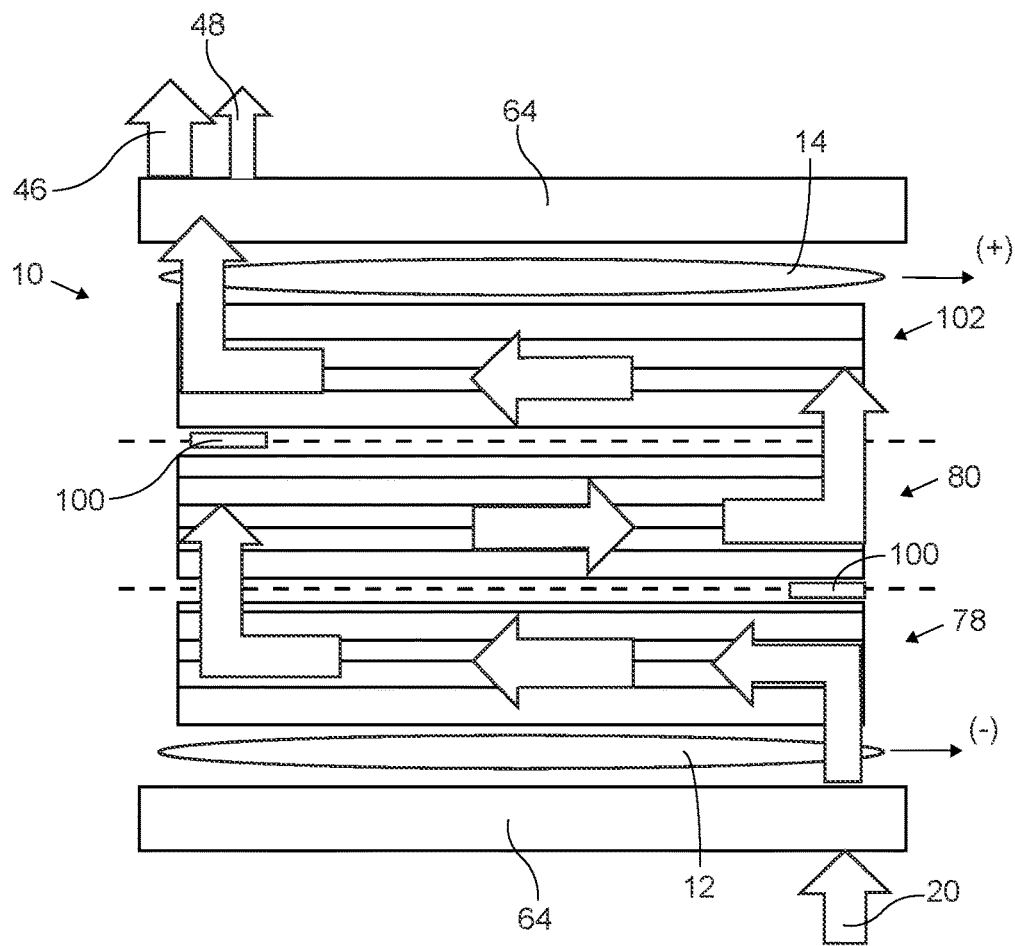
FIG. 21 is an illustration of a flow path through a multi-hydraulic-stage electrodialysis stack 10 without shared electrodes between the stages 78, 80, and 102.

Multi-Stage Exemplifications without Shared Electrodes:

FIG. 21 shows an exemplification of a multi-hydraulic-stage electrodialysis stack 10 that, unlike the exemplification of FIG. 9, does not include a shared electrode between stages. In this exemplification, the number of hydraulic stages refers to the number of passes the water makes along the membranes within an electronic stage (between a particular set of electrodes 12 and 14). Accordingly, the stack 10 illustrated in FIG. 21 is considered to include a first stage (N1) 78, a second stage (N2) 80, a third stage (N3) 102, representing each pass of the flows through the stack 10, wherein flow blocking membranes 100 are employed between stages 78, 80, and 102. The blocking membranes 100 do not contain the feed entry ports, preventing flow across the stack 10 and diverting the flows back and forth through the stack 10.

Water desalinates by flowing along the membranes at each stage 78/80/102 in the ED stack 10 and becomes dilute from the first stage 78 to the third stage 102. The multi-hydraulic stage design reduces the cost associated with electrodes 12 and 14 and allows for controlling the linear flow velocity at each stage 78/80/102 by tailoring the number of cell pairs, the dimensions of the flow path, and the properties of the spacer mesh used in the flow channels. The limiting current increases with greater cross-channel mixing at a higher linear flow velocity. Hence, in a multi-hydraulic-stage ED stack, higher linear flow velocity is preferred at final stages, where the water is desalinated and where the limiting current density is low. The residence time of the flow inside the electrodialysis stack 10 is controlled via adjusting the linear flow velocity and increasing the number of hydraulic stages. Increases in limiting current density and residence time, overall, enhance the desalination efficiency.

Figure 22:
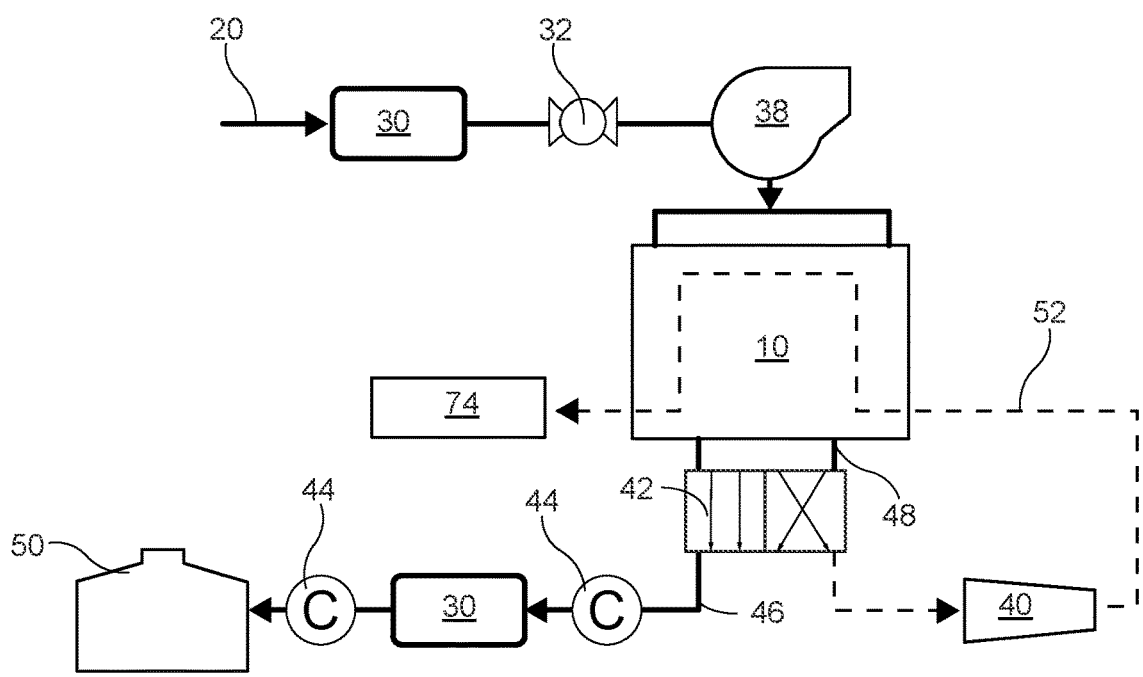
FIG. 22 is a schematic illustration of a system using a single pump 38 to generate the flows through the multi-hydraulic-stage electrodialysis stack 10 of FIG. 21.

As shown in FIG. 22, the multi-stage electrodialysis stack 10 of FIG. 21 can be similarly included in a desalination system that includes a single pump 38 for driving all of the flows in the system. Using the pressure regulator 40 on the concentrate streams 48 and 52 to adjust their flow before the concentrate stream 52 is discharged to a disposal tank 74 enables reaching water recovery greater than 50%.

Evaluation of the Desalination Performance of Multi-Hydraulic-Stage ED Stack:

To investigate the effects of multiple hydraulic stages on desalination performance, a three-hydraulic-stage ED stack 10, including 15 cell pairs in the first stage (N1=15) 78, 15 in the second stage (N2=15) 80, and 10 in the third stage (N3=10) 102 was fabricated and compared to a single-stage ED stack 10, including a net of 40 cell pair counts. Properties and costs of the 40-cell pair single- and three-hydraulic-stage ED stacks are summarized in Table 4, below. The feedwater used in the desalination experiments was a 2,000 mg/L NaCl solution, representing the salinity range of brackish water.

Figure 23:
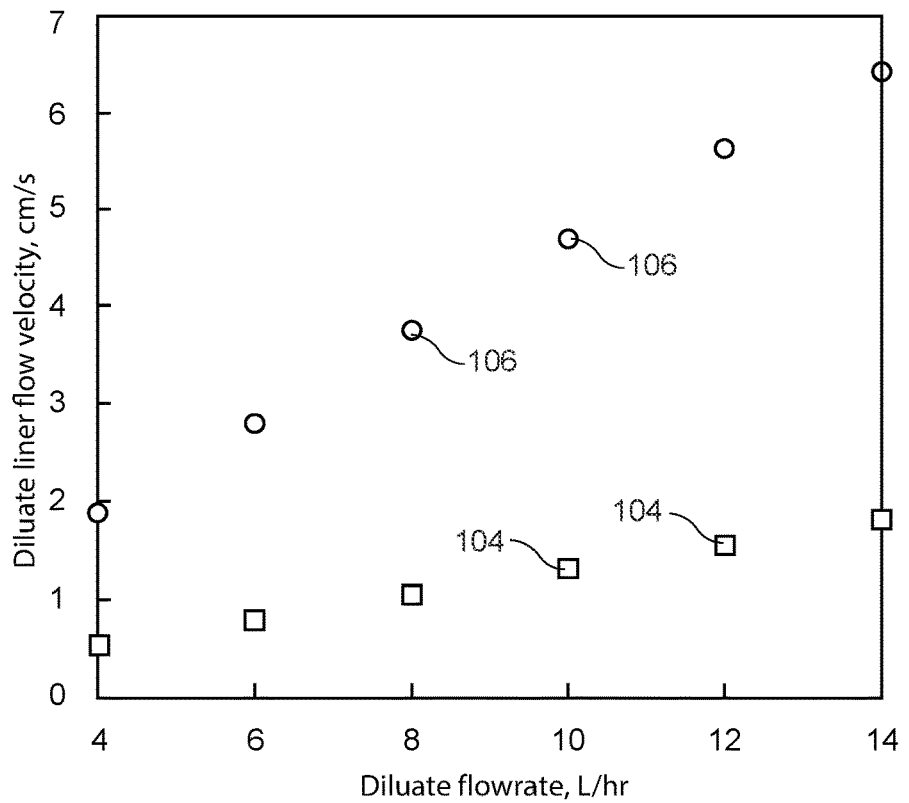
FIG. 23 is a plot of diluate linear flow velocity (cm/s) 101 versus diluate flowrate (L/hr) 102 for a single-stage ED stack 104 (shown with squares) including 40 cell pairs and a three-hydraulic-stage ED stack 106 (shown with circles) including 15 cell pairs in the first stage, 15 cell pairs in the second stage, and 10 cell pairs in the third stage and a feedwater salinity of 2,000 mg/L NaCl.
Figure 24:
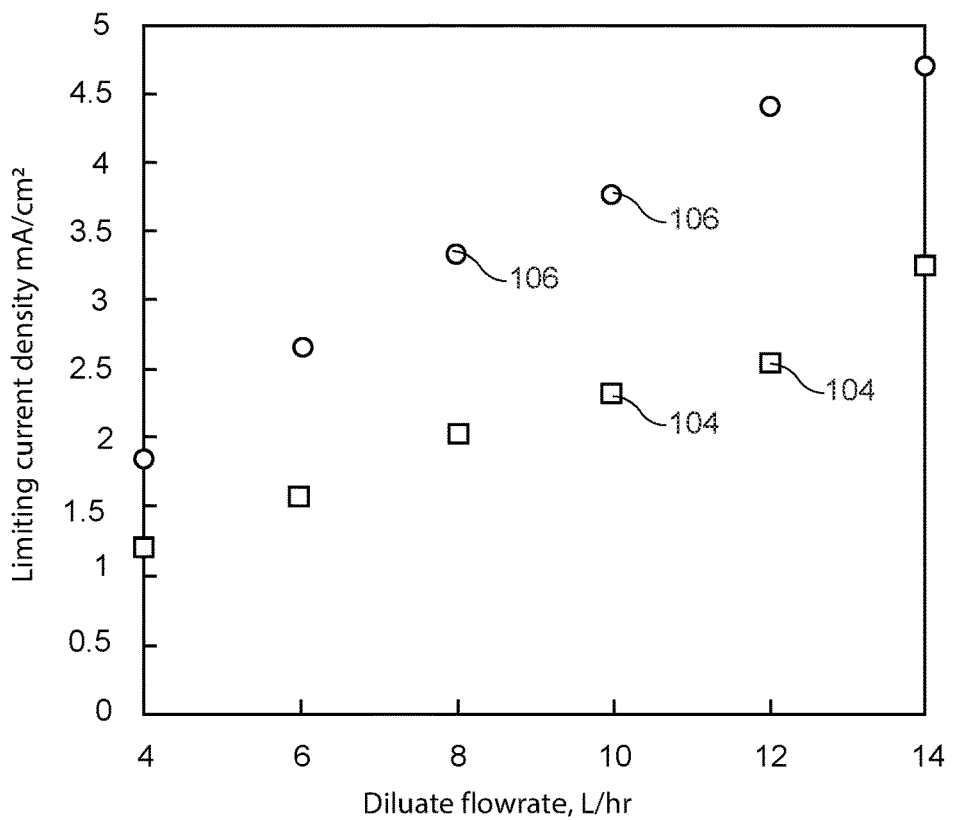
FIG. 24 is a plot of limiting current density (mA/cm$^2$) versus diluate flowrate (L/hr) 102 for a single-stage ED stack 104 (squares) including 40 cell pairs and a three-hydraulic-stage ED stack 106 (circles) including 15 cell pairs in the first stage, 15 cell pairs in the second stage, and 10 cell pairs in the third stage and a feedwater salinity of 2,000 mg/L NaCl.
Figure 25:
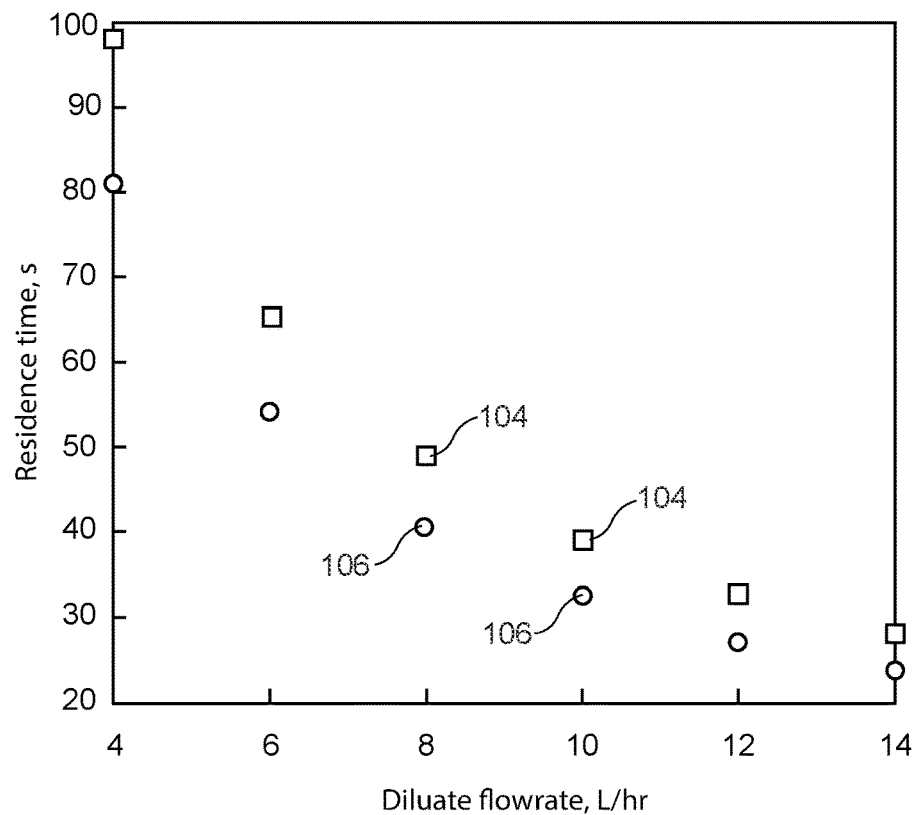
FIG. 25 is a plot of residence time (seconds) versus diluate flowrate (L/hr) for a single-stage ED stack 104 (squares) including 40 cell pairs and a three-hydraulic-stage ED stack 106 (circles) including 15 cell pairs in the first stage, 15 cell pairs in the second stage, and 10 cell pairs in the third stage and a feedwater salinity of 2,000 mg/L NaCl.
Figure 26:
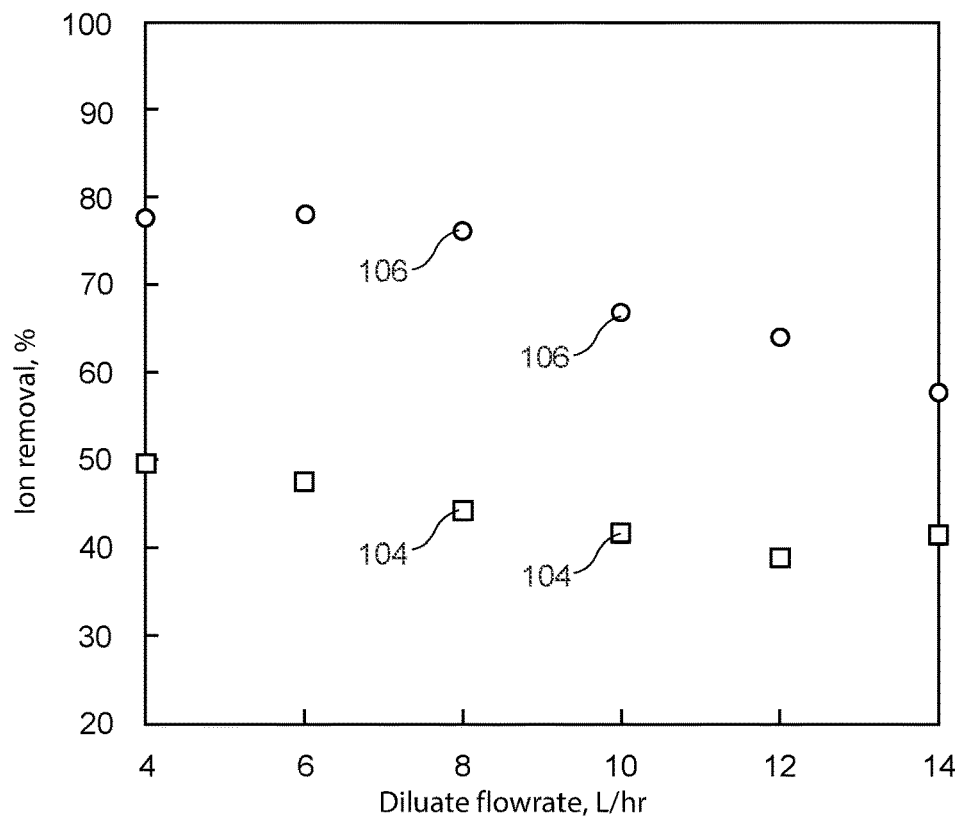
FIG. 26 is a plot of ion removal (as percentage) versus diluate flowrate (L/hr) for a single-stage ED stack 104 (squares) containing 40 cell pairs and a three-hydraulic-stage ED stack 106 (circles) including 15 cell pairs in the first stage, 15 cell pairs in the second stage, and 10 cell pairs in the third stage and a feedwater salinity of 2,000 mg/L NaCl.
Figure 27:
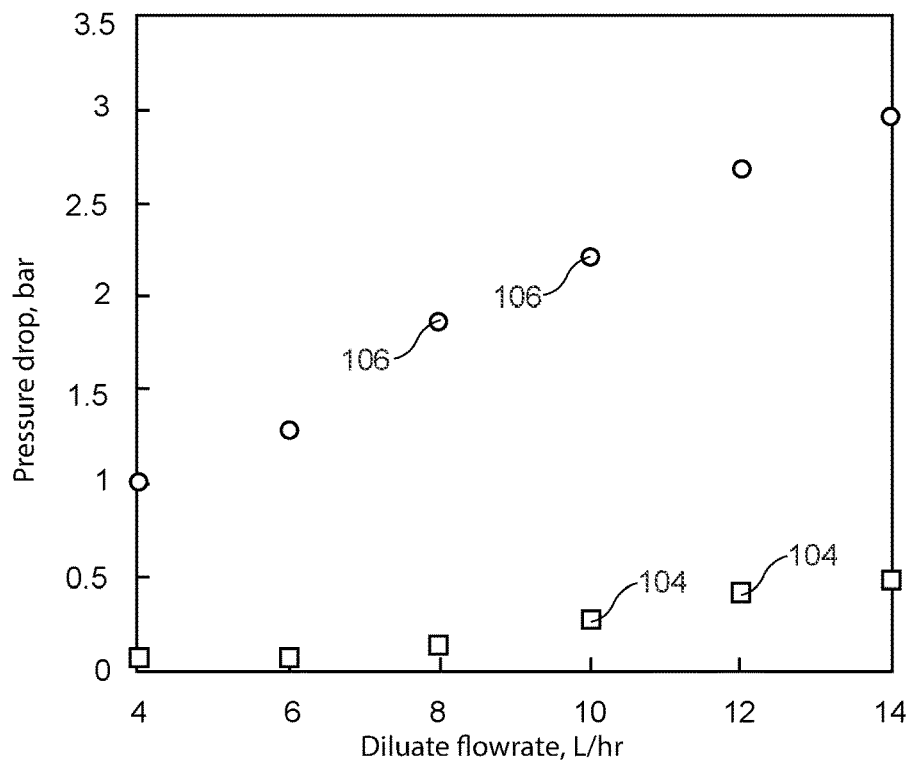
FIG. 27 is a plot of pressure drop (bar) versus linear feed velocity (cm/s) in the diluate channel for a single-stage ED stack 104 (squares) containing 40 cell pairs and a three-hydraulic-stage ED stack 106 (circles) including 15 cell pairs in the first stage, 15 cell pairs in the second stage, and 10 cell pairs in the third stage and a feedwater salinity of 2,000 mg/L NaCl.

FIG. 23 compares the diluate linear flow velocity in the three-hydraulic-stage design 106 (average of the flow velocity in the three stages) to that of the single-stage ED stack 104. Even though the net cell pair counts are identical for both ED units, the diluate linear flow velocity is higher in the three-hydraulic-stage stack due to a lower number of cell pairs at each stage compared to the net cell pair counts. As shown in FIG. 24, the limiting current density improved by 60% in the three-hydraulic-stage ED stack 106 compared to the single-stage unit 104 due to the relatively high linear flow velocity and greater cross-channel mixing in the three-hydraulic-stage ED stack. As shown in FIG. 25, such high linear flow velocity in channels led to an approximately 20% reduction in the overall residence time of the solution inside the three-hydraulic-stage stack 106 even with multiple passes of the flow along the membranes. FIG. 26 shows that the cumulative impacts on limiting current density and residence time resulted in an improvement of up to 60% in ion removal using the three-hydraulic-stage ED stack 106. However, the higher linear flow velocity inside the channels increased the pressure drops in the three-hydraulic-stage ED 106, as is evidenced in FIG. 27.

Figure 28:
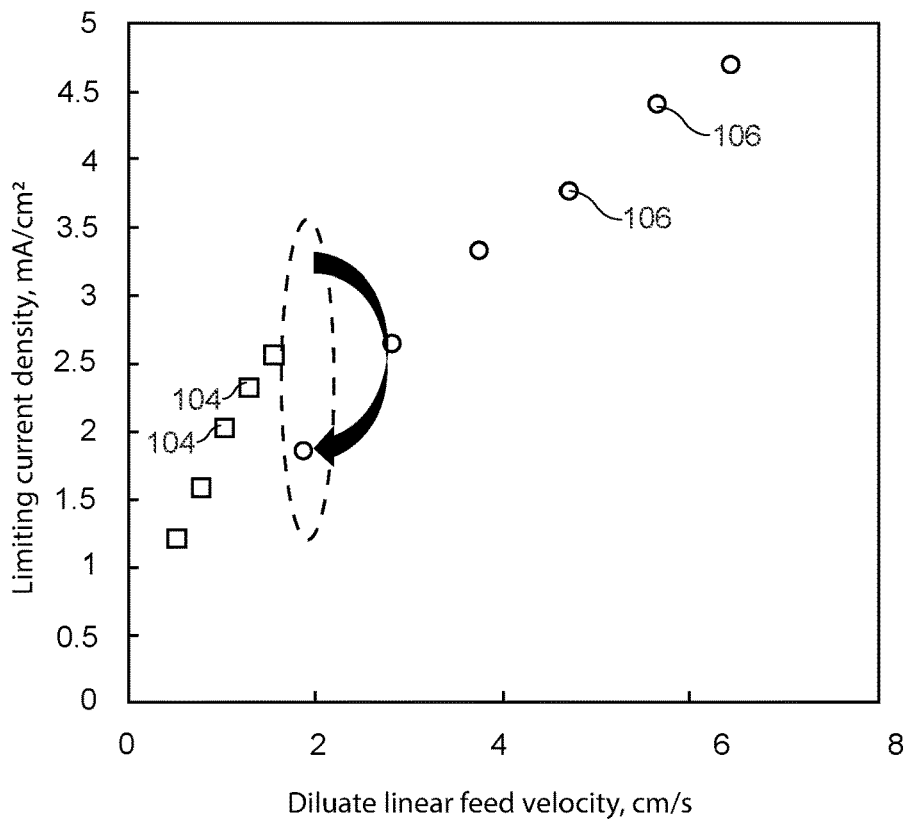
FIG. 28 is a plot of limiting current density (mA/cm$^2$) versus linear flow velocity (cm/s) in the diluate channel for a single-stage ED stack 104 (squares) containing 40 cell pairs and a three-hydraulic-stage ED stack 106 (circles) including 15 cell pairs in the first stage, 15 cell pairs in the second stage, and 10 cell pairs in the third stage and a feedwater salinity of 2,000 mg/L NaCl.
Figure 29:
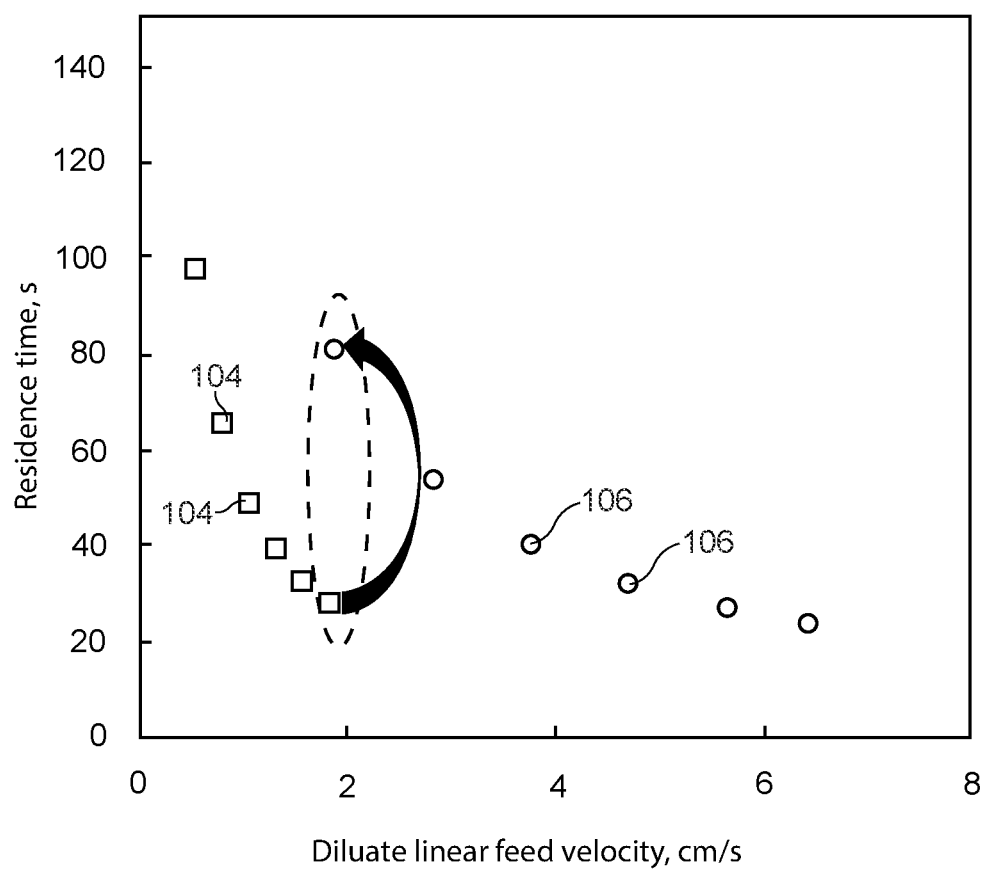
FIG. 29 is a plot of residence time (seconds) versus linear flow velocity (cm/s) in diluate channel for a single-stage ED stack 104 (squares) containing 40 cell pairs and a three-hydraulic-stage ED stack 106 (circles) including 15 cell pairs in the first stage, 15 cell pairs in the second stage, and 10 cell pairs in the third stage and a feedwater salinity of 2,000 mg/L NaCl.

FIGS. 28 and 29 demonstrate the limiting current density and residence time versus the diluate linear flow velocity for both single-hydraulic-stage ED stacks 104 and three-hydraulic stage ED stacks 106. As indicated, for equal diluate linear flow velocity (occurring at a flowrate of 4 L/hr in the three-hydraulic-stage stack 106 and at a flowrate of 14 L/hr in the single-stage unit 104), the residence time in the three-hydraulic-stage design 106 increased by 190% (as shown by the arrow in FIG. 29) due to multiple passes of the flow along the membranes. However, the limiting current density decreased by 42% (as shown by the arrow in FIG. 28) due to the lower bulk concentration in the final stage of the three-hydraulic-stage ED stack 106 compared to the outlet bulk concentration of the single-stage unit 104. The improvement in residence time resulted in an 87% increase in ion removal in the three-hydraulic-stage design even with relatively low limiting current density.

These results suggest that to maximize the effectiveness of the multi-hydraulic-stage design for ion removal under the same flowrate as the single-stage unit, residence time should increase through a series of approaches, including the reduction in the averaged linear flow velocity in initial stages by addition of extra cell pairs, by increasing the number of passes water takes along the membranes by addition of extra stages, and by decreasing the flow velocity by modification of the spacer mesh. The first two approaches lead to an increase in the required membrane area and a higher cost of the stack. However, spacer-mesh modification can be a cost-effective approach to enhance the residence time. Thicker spacer mesh with higher porosity and a higher open area fraction reduces the linear flow velocity (enhancing the residence time) inside the channels as well as reducing spacer shadow effects. Such impacts lower the pressure drop inside the stack in addition to improving ion-removal efficiency.

TABLE 4

Properties and costs of the fabricated 40-cell pair single- and three-hydraulic-stage electrodialysis stacks:

| | |
|---|---|
| Feedwater | 2000 mg/L NaCl solution |
| Water recovery | 50% |
| Flow channel dimensions | |
| Width, m | 0.02 |
| Length, m | 0.51 |
| Spacer properties | |
| Thickness, mm | 0.26 |
| Open area fraction | 0.45 |
| Void fraction | 0.84 |
| Membrane properties | |
| Total area, m$^2$ | 0.964 |
| Resistance of AEM, Ω/cm$^2$ | 40 |
| Resistance of CEM, Ω/cm$^2$ | 40 |
| Electrode dimensions | |
| Total area, m$^2$ | 0.024 |
| Overall cost of the stack (membranes + electrodes) | $86.2 |

In describing embodiments, herein, specific terminology is used for the sake of clarity. For the purpose of description, specific terms are intended to at least include technical and functional equivalents that operate in a similar manner to accomplish a similar result. Additionally, in some instances where a particular embodiment includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments, those parameters or values can be adjusted up or down by $\frac{1}{100}^{th}$, $\frac{1}{50}^{th}$, $\frac{1}{20}^{th}$, $\frac{1}{10}^{th}$, $\frac{1}{5}^{th}$, $\frac{1}{3}^{rd}$, $\frac{1}{2}$, $\frac{2}{3}^{rd}$, $\frac{3}{4}^{th}$, $\frac{4}{5}^{th}$, $\frac{9}{10}^{th}$, $\frac{19}{20}^{th}$, $\frac{49}{50}^{th}$, $\frac{99}{100}^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $\frac{1}{100}^{th}$, the value of the parameter may be in a range from 0.99 to 1.01), unless otherwise specified. Further still, where methods are recited and where steps/stages are recited in a particular order—with or without sequenced prefacing characters added for ease of reference—the steps/stages are not to be interpreted as being temporally limited to the order in which they are recited unless otherwise specified or implied by the terms and phrasing.

While this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention.

What is claimed is:

1. An electrodialysis desalination device, comprising:
a first electrode including a first-stage side;
a second electrode including a first-stage side;
a first stage between the first-stage side of the first electrode and the first-stage side of the second electrode, the first stage including at least one first-stage cell pair positioned between the first-stage side of the first electrode and the first-stage side of the second electrode, each cell pair including a pair of first-stage selectively permeable ion-exchange membranes with alternating selectivity that define first-stage channels on opposite sides of each first-stage membrane for respective flows of a first-stage diluate stream and a first-stage concentrate stream between the first electrode and the second electrode, wherein each of the first-stage channels includes an inlet and an outlet;
a second stage including at least one second-stage cell pair including a plurality of second-stage selectively permeable ion-exchange membranes with alternating selectivity that define second-stage channels on opposite sides of each second-stage membrane for respective flows of a second-stage diluate stream and a second-stage concentrate stream, wherein the outlet for the first-stage channel through which the first-stage diluate stream flows is in fluid communication with the inlet of the second-stage channel through which the second-stage diluate stream flows, and wherein the outlet for the first-stage channel through which the first-stage concentrate stream flows is in fluid communication with the inlet of the second-stage channel through which the second-stage concentrate stream flows;
a single pump configured to pump the diluate streams and the concentrate streams through the first stage and through the second stage, wherein, in each stage, the concentrate stream has an increased ion content that is greater than the ion content of the diluate stream; and
a plurality of flow restrictors in or in communication with a plurality of the channels selected from the first-stage channels and the second-stage channels through which the first-stage and second-stage diluate and concentrate streams respectively flow, wherein each of the flow restrictors is configured to receive at least one of the diluate or concentrate streams in one of the selected channels of the first stage or the second stage, and wherein the flow restrictors are configured in combination with the single pump to generate a flow rate of the diluate stream that is independent and distinct from a flow rate of the concentrate stream through the first-stage and second-stage channels.

2. The electrodialysis desalination device of claim 1, wherein the second electrode further comprises a second-stage side facing oppositely away from the first-stage side of the second electrode, the device further comprising a third electrode including a second-stage side, wherein the second stage is between the second-stage side of the second electrode and the second-stage side of the third electrode.

3. The electrodialysis desalination device of claim 2, further comprising a third stage including at least one third-stage cell pair including a plurality of third-stage selectively permeable ion-exchange membranes with alternating selectivity that define third-stage channels on opposite sides of each third-stage membrane for respective flows of a third-stage diluate stream and a third-stage concentrate stream, wherein the outlet for the second-stage channel through which the second-stage diluate stream flows is in fluid communication with the inlet of the third-stage channel through which the third-stage diluate stream flows, and wherein the outlet for the second-stage channel through which the second-stage concentrate stream flows is in fluid communication with the inlet of the third-stage channel through which the third-stage concentrate stream flows, and wherein the single pump is further configured to pump the diluate stream and the concentrate stream through the third stage, and wherein the third electrode further comprises a third-stage side facing oppositely away from the second-stage side of the third electrode, the device further comprising a fourth electrode including a third-stage side, wherein the third stage is between the third-stage side of the third electrode and the third-stage side of the fourth electrode.

4. The electrodialysis desalination device of claim 1, wherein the first stage and the second stage are adjacent to one another without an electrode therebetween.

5. The electrodialysis desalination device of claim 1, wherein the electrodialysis desalination device is configured for the diluate and concentrate streams to flow through the second stage in a direction opposite to the flow of the diluate and concentrate streams through the first stage.

6. The electrodialysis desalination device of claim 1, further comprising a voltage source in electrical communication with the electrodes and configured to apply respective charges to the first electrode, to the second electrode, and to the third electrode, wherein the charge applied to the second electrode is opposite to the charges applied to the first and third electrodes.

7. The electrodialysis desalination device of claim 1, wherein the inlets to the first-stage channels are in fluid communication with an aqueous saline source.

8. The electrodialysis desalination device of claim 1, further comprising a voltage source in electrical communication with the electrodes and configured to apply a charge to the second electrode and a charge to the first electrode, wherein the charge applied to the second electrode is opposite to the charge applied to the first electrode.

9. The electrodialysis desalination device of claim 1, wherein the flow restrictors, the pump, and the channels are configured to flow the diluate stream through the channels at a rate at least twice as great as the rate at which the concentrate stream flows through the channels.

10. The electrodialysis desalination device of claim 1, wherein the flow restrictors, the pump, and the channels are configured to flow the diluate stream through the channels at a rate at least 10 times as great as the rate at which the concentrate stream flows through the channels.

11. The electrodialysis desalination device of claim 1, wherein the channels for the diluate streams and for the concentrate streams are configured for a continuous single pass of the diluate and concentrate streams.

12. The electrodialysis desalination device of claim 1, further comprising a sensor configured to measure the salinity of a saline feed stream as it enters the channels, wherein the device is configured to adjust the voltage charge applied to the electrodes in response to the measured salinity to establish a desired current density for ions passing through the membranes.

13. The electrodialysis desalination device of claim 12, wherein the device is configured to adjust the voltage charge to establish a desired current density that is set at a limiting current density minus a safety factor, and wherein the desired current density is about 50-95% of the limiting current density.

14. The electrodialysis desalination device of claim 1, wherein each of the flow restrictors is in a flow path between at least one of the outlets of the first-stage channels and at least one of the inlets of the second-stage channels and is configured to control the flow of at least one of the diluate stream and the concentrate stream between the first and second stages, and wherein the single pump is outside of this flow path.

15. The electrodialysis desalination device of claim 1, wherein the flow restrictors are configured to change the relative flow rates of the diluate and concentrate streams through the channels.

16. The electrodialysis desalination device of claim 15, wherein the flow restrictors include a plurality of valves.

17. The electrodialysis desalination device of claim 1, wherein the flow restrictors include valves combined with the selected channels, wherein the valves and the selected channels are configured for the valves to govern the flow rates of the diluate and concentrate streams through the selected channels.

18. A method for continuous electrodialysis desalination using the electrodialysis desalination device of claim 10, the method comprising:
    using the single pump to flow an aqueous saline feed stream through inlets of the first-stage channels;
    using a voltage source to apply a first charge to the first and electrode and to apply a second charge to the second electrode, wherein the first charge is opposite the second charge;
    selectively extracting ions through the first-stage membranes, thereby producing the first-stage diluate stream and the first-stage concentrate stream in respective first-stage channels;
    extracting the first-stage diluate stream from the outlet of the first-stage channel for the first-stage diluate stream;
    extracting the first-stage concentrate stream from the outlet of the first-stage channel for the first-stage concentrate stream;
    using the single pump to flow the first-stage diluate stream from the outlet of the first-stage channel for the diluate stream into the inlet of the second-stage channel for the diluate stream;
    using the single pump to flow the first-stage concentrate stream from the outlet of the first-stage channel for the concentrate stream into the inlet of the second-stage channel for the concentrate stream;
    selectively extracting ions through the second-stage membranes, thereby producing the second-stage diluate stream and the second-stage concentrate stream in respective second-stage channels;
    extracting the second-stage diluate stream from the outlet of the second-stage channel for the diluate stream; and
    extracting the second-stage concentrate stream from the outlet of the second-stage channel for the concentrate stream.

19. The method of claim 18, wherein the second electrode further comprises a second-stage side facing oppositely away from the first-stage side of the second-electrode, the device further comprising a third electrode including a second-stage side, wherein the second stage is between the second-stage side of the second electrode and the second-stage side of the third electrode, the method further comprising using the voltage source to apply a third charge of the same sign as the first charge to the third electrode.

20. The method of claim 19, wherein the electrodialysis desalination device further comprises a third stage including at least one third-stage cell pair including a pair of third-stage selectively permeable ion-exchange membranes with alternating selectivity that define third-stage channels for the diluate stream and for the concentrate stream on opposite sides of each third-stage membrane, the device further comprising a fourth electrode including a third-stage side, wherein the third electrode further comprises a third-stage side facing oppositely away from the second-stage side of the third electrode, wherein the third stage is between the third-stage side of the third electrode and the third-stage side of the fourth electrode, wherein each of the third-stage channels includes an inlet and an outlet, the method further comprising:
    using the single pump to flow the second-stage diluate stream from the outlet of the second-stage channel for the diluate stream into the inlet of the third-stage channel for the diluate stream;
    using the single pump to flow the second-stage concentrate stream from the outlet of the second-stage channel for the concentrate stream into the inlet of the third-stage channel for the concentrate stream;
    selectively extracting ions through the third-stage membranes, thereby producing the third-stage diluate stream and the third-stage concentrate stream in respective second-stage channels;
    extracting the third-stage diluate stream from the outlet of the third-stage channel for the diluate stream; and
    extracting the third-stage concentrate stream from the outlet of the third-stage channel for the concentrate stream.

21. The method of claim 18, wherein the first stage and the second stage are adjacent to one another without an electrode therebetween.

22. The method of claim 18, further comprising flowing the diluate and concentrate streams through the second stage in a direction opposite to the flow of the diluate and concentrate streams through the first stage.

23. A method for continuous electrodialysis desalination using the electrodialysis desalination device of claim 10, the method comprising:
    using the single pump to flow an aqueous saline feed stream through inlets of the first-stage channels;
    using a voltage source to apply a first charge to the first electrode and to apply a second charge to the second electrode, wherein the first charge is opposite the second charge;
    selectively extracting ions through the first-stage membranes, thereby producing the first-stage diluate stream and the first-stage concentrate stream in respective first-stage channels;
    extracting the first-stage diluate stream from the outlet of the first-stage channel for the first-stage diluate stream;
    extracting the first-stage concentrate stream from the outlet of the first-stage channel for the first-stage concentrate stream; and
    using the single pump and the flow restrictors to independently control flow of (a) the diluate streams and (b) the concentrate streams to establish a flow rate of the diluate streams that is independent and distinct from the flow rate of the concentrate stream.

24. The method of claim 23, wherein the flow rate of each diluate stream is at least twice as great as the flow rate of each concentrate stream.

25. The method of claim 23, wherein the diluate and concentrate streams flow continuously through the device without being recycled in batches.

26. The method of claim 23, wherein the diluate stream is extracted from the device at a flow rate of 5-50 L/hour.

27. The method of claim 23, wherein the outlets of the channels include valves configured to control whether flow is directed to a product output or to a rinse/rejection stream, the method further comprising periodically switching the charges on the electrodes to reverse ion flow through the membranes into the channels to remove scaling in the concentrate channels and controlling the valves to redirect flow when the charges are switched.

28. The method of claim 23, further comprising:
measuring the salinity of the aqueous feed stream as it enters the channels; and
adjusting the voltage charge applied to the electrodes to establish a desired current density for ions passing through the membranes.

29. The method of claim 23, wherein the voltage charge is adjusted to establish a desired current density that is set at a limiting current density minus a safety factor.

30. The method of claim 29, wherein the desired current density is set to about 50-95% of the limiting current density.

* * * * *

UNITED STATES PATENT AND TRADEMARK OFFICE
CERTIFICATE OF CORRECTION

PATENT NO. : 12,397,263 B2  
APPLICATION NO. : 18/021000  
DATED : August 26, 2025  
INVENTOR(S) : Varner et al.

Page 1 of 1

It is certified that error appears in the above-identified patent and that said Letters Patent is hereby corrected as shown below:

In the Claims

In Claim 18, at Column 21, Line 28, replace "claim 10" with --claim 1--.

In Claim 18, at Column 21, Lines 32-33, replace "first and electrode" with --first electrode--.

In Claim 23, at Column 22, Line 46, replace "claim 10" with --claim 1--.

Signed and Sealed this  
Fourth Day of November, 2025

John A. Squires  
*Director of the United States Patent and Trademark Office*